United States Patent
Sadamatsu et al.

(10) Patent No.: US 8,832,637 B2
(45) Date of Patent: Sep. 9, 2014

(54) SUPPORT APPARATUS AND INFORMATION PROCESSING METHOD THEREOF

(75) Inventors: Toshisato Sadamatsu, Kawasaki (JP); Shinichi Hama, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/347,078

(22) Filed: Jan. 10, 2012

(65) Prior Publication Data

US 2012/0192140 A1 Jul. 26, 2012

(30) Foreign Application Priority Data

Jan. 25, 2011 (JP) ................. 2011-013373

(51) Int. Cl.
*G06F 17/50* (2006.01)

(52) U.S. Cl.
USPC ............ 716/137; 716/126; 716/127; 716/130

(58) Field of Classification Search
USPC ........................................................ 716/137
See application file for complete search history.

(56) References Cited

U.S. PATENT DOCUMENTS

2007/0083841 A1* 4/2007 Lantz ............................... 716/15
2009/0138836 A1* 5/2009 Budell et al. ..................... 716/5

FOREIGN PATENT DOCUMENTS

| JP | 2007-11629 A | 1/2007 |
| JP | 3977638 B | 9/2007 |
| JP | 2007-272342 A | 10/2007 |
| JP | 2009-146271 A | 7/2009 |

OTHER PUBLICATIONS

Korean Office Action issued in corresponding application No. 10-2012-0006493 dated Jan. 27, 2014.

* cited by examiner

*Primary Examiner* — Jack Chiang
*Assistant Examiner* — Eric Lee
(74) *Attorney, Agent, or Firm* — Carter, DeLuca, Farrell & Schmidt, LLP

(57) ABSTRACT

Layout information indicating locations of at least components and conductive layers in a printed circuit board, and layouts of conductive wiring patterns on the respective conductive layers and vias which electrically connect between the conductive layers is obtained from a memory. With reference to the layout information, path information indicating a path of one signal line is generated. With reference to the layout information and path information, a divide portion where a path of a return current corresponding to a signal current of the signal line is divided are detected. With reference to the layout information and path information, information indicating a detour path of the return current in a neighborhood of the divide portion is generated.

11 Claims, 20 Drawing Sheets

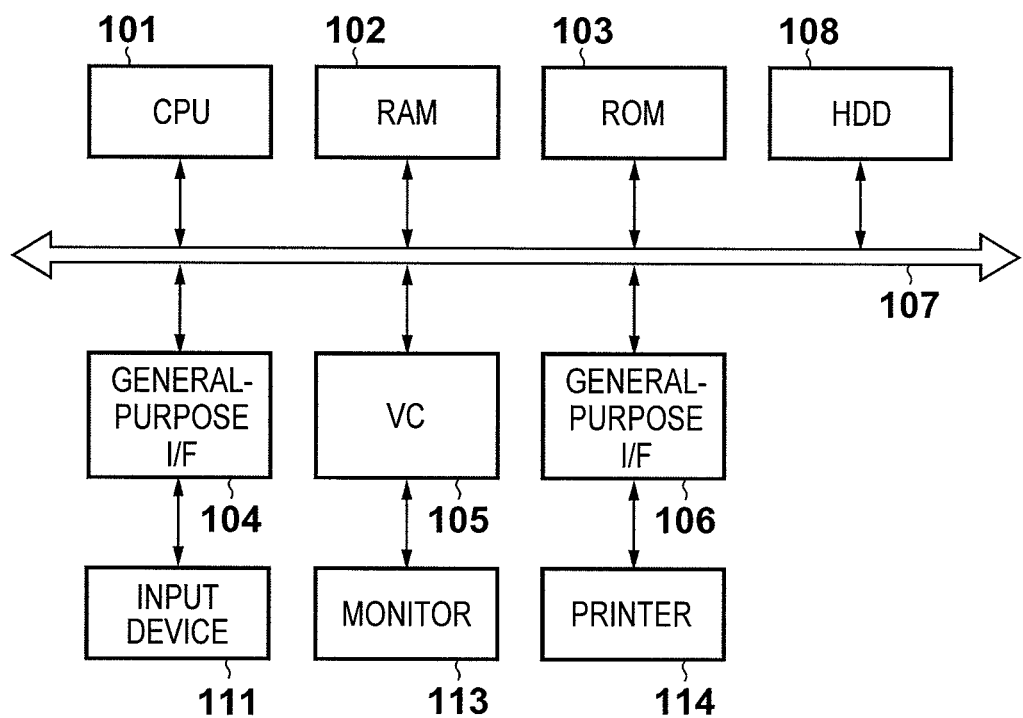
F I G. 1

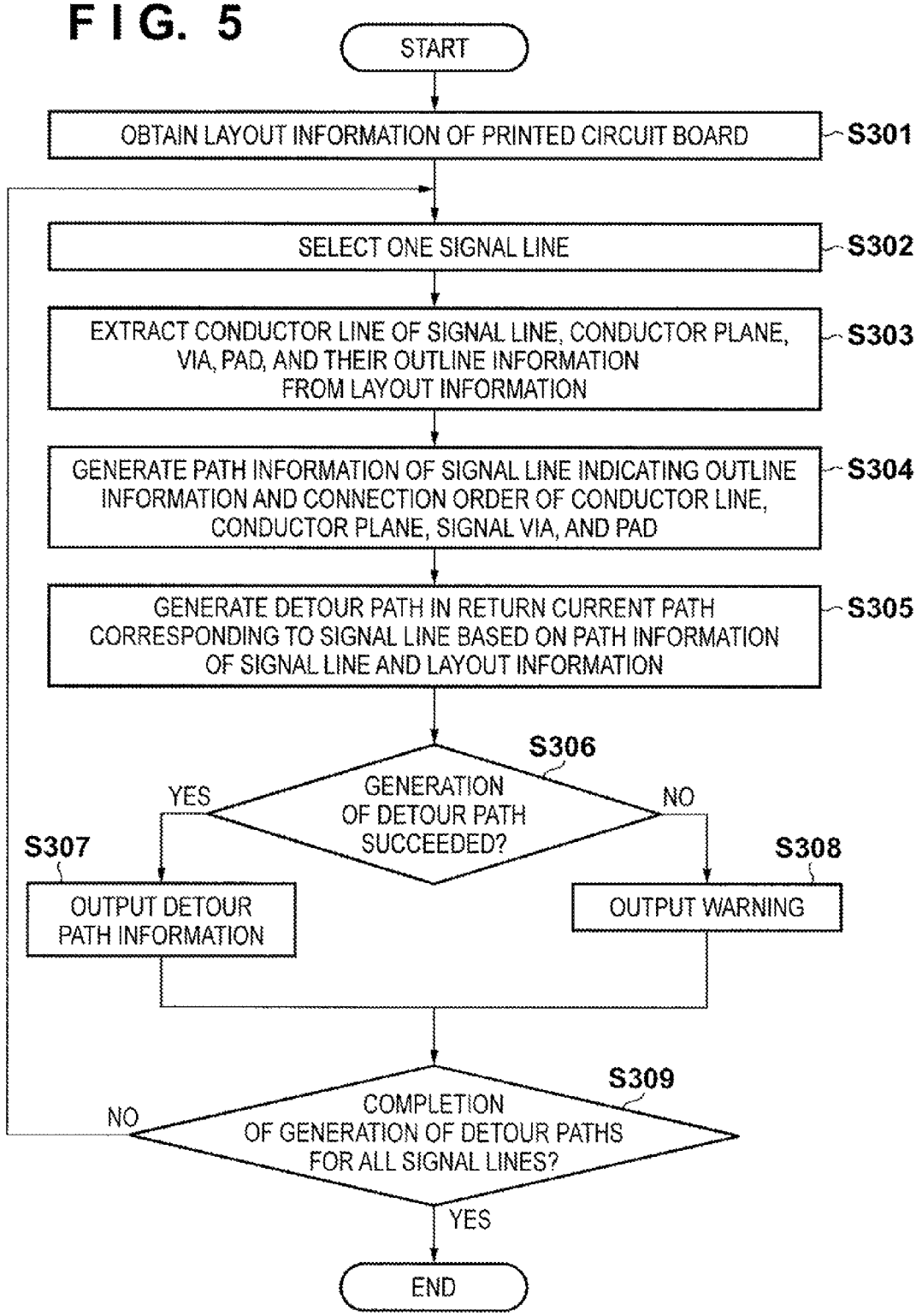

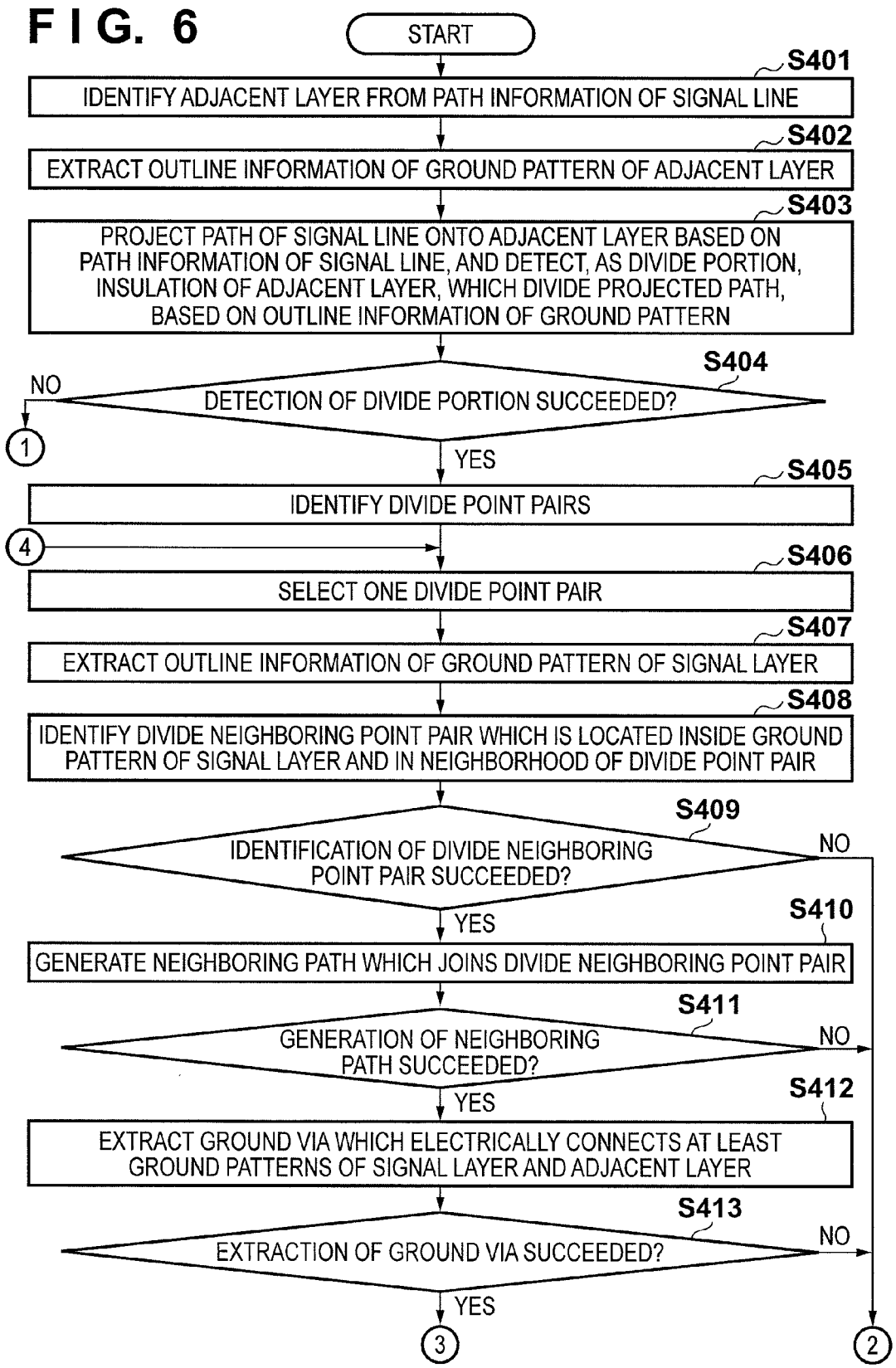

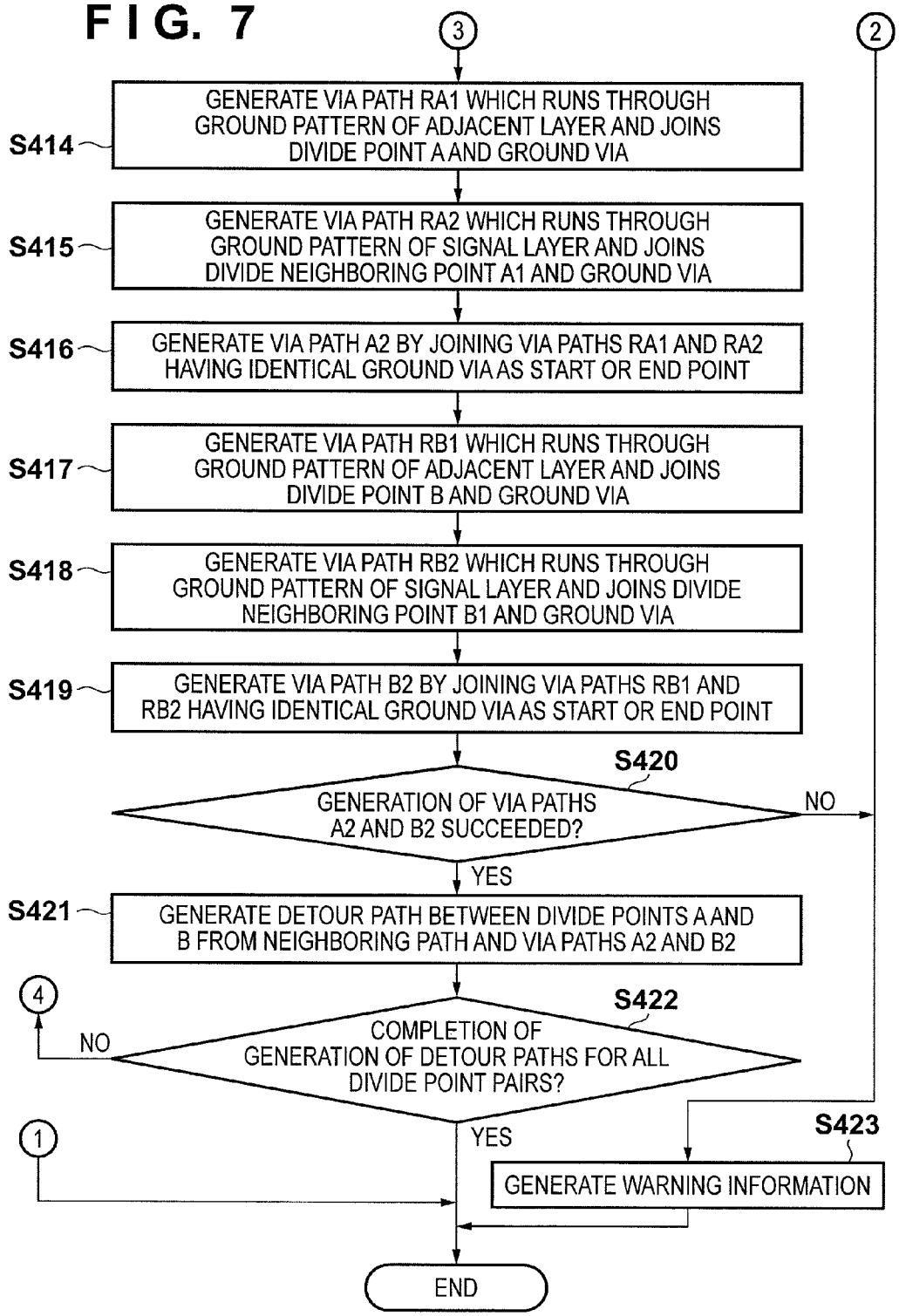

F I G. 14

| CONDITION SETTING SCREEN | | |
|---|---|---|
| VIA EXTRACTION RANGE : | 5 | mm |
| NEIGHBORING PATH GENERATION ALLOWABLE RANGE : | 1 | mm |

F I G. 19
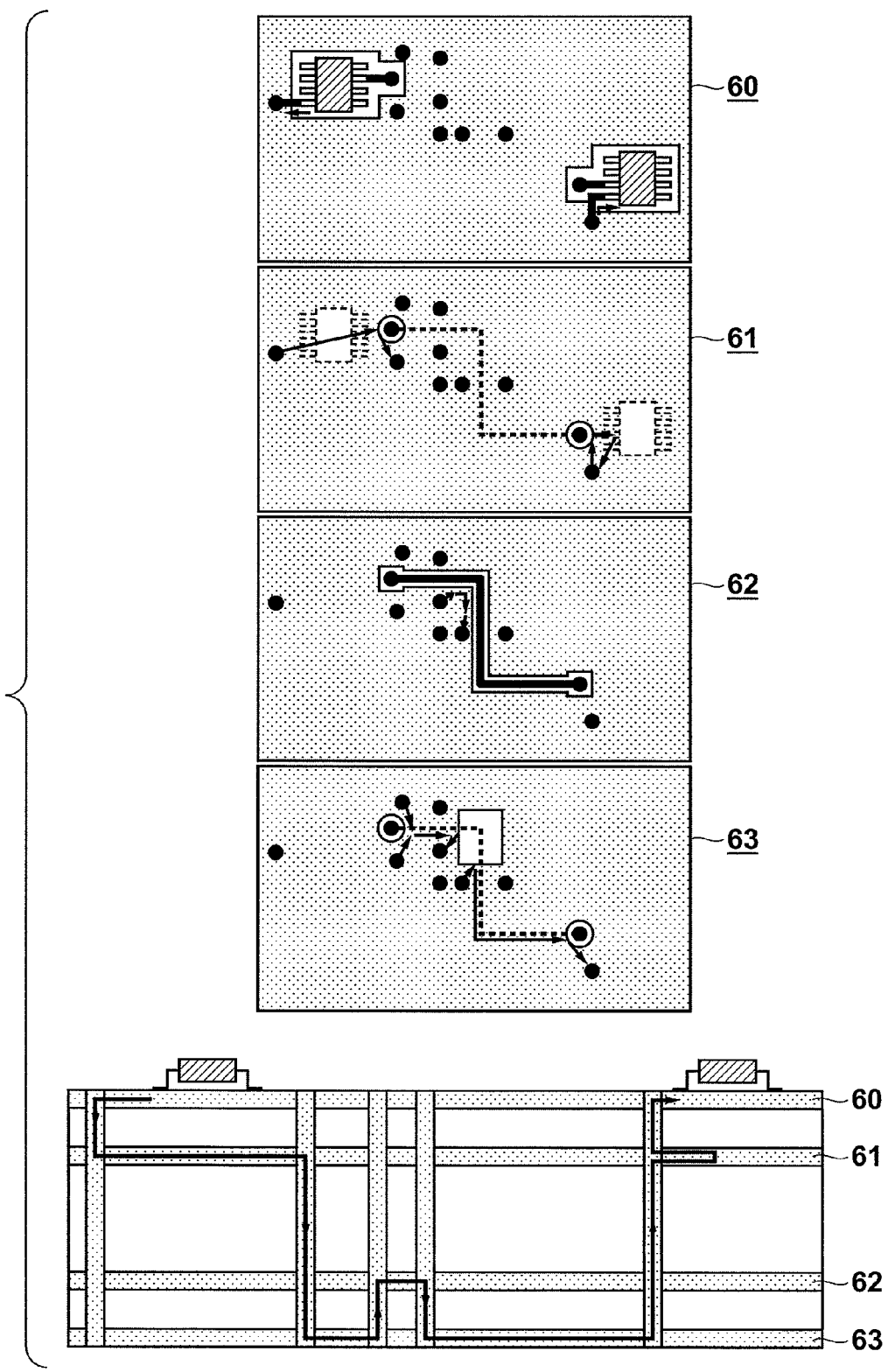

F I G. 20

| No. | SIGNAL LINE NAME | LAYER | DIVIDE PORTION | DETOUR LENGTH | GENERATION FAILURE CAUSE |
|---|---|---|---|---|---|
| 1 | net-A | L4 | (50,40) | NONE | GENERATION FAILURE OF NEIGHBORING PATH OF SIGNAL LAYER |
| 2 | net-A | L4 | (50,40) | 10mm | — |

SUPPORT APPARATUS AND INFORMATION PROCESSING METHOD THEREOF

BACKGROUND OF THE INVENTION

1. Field of the Invention

The present invention relates to design support of a print circuit board.

2. Description of the Related Art

As electronic equipment gains higher speed and more advanced functions, it handles a signal including high frequency components (to be referred to a high-speed signal hereinafter), and a problem of emission noise generated from the electronic equipment becomes obvious. As main generation causes of the emission noise, division and detour of a "return current" path induced in the neighborhood of a signal path of the high-speed signal are known.

In order to avoid division and detour of the return current path in the design stage of a printed circuit board, the return current path is simply derived and visualized based on CAD (Computer Aided Design) data of the printed circuit board. Then, a designer or checker of the printed circuit board visually checks division or detour of the return current path, and judges whether modifications of the conductive wiring patterns and the layout of parts are needed. If such modifications are necessary, the designer or checker modifies the conductive wiring patterns or the layout of parts.

As a method of deriving the return current path, the following techniques have been proposed.

The invention of Japanese Patent Laid-Open No. 2009-146271 (literature 1) defines, as nodes which are numbered along the signal lines, bent points of a signal line, vias for interlayer connections, and intersections between edges of a conductive wiring pattern and the signal line, where a return current is induced. The invention selects, from the respective nodes, those through which a return current path may run as return node candidates. Then, the invention derives a path defined by joining the return node candidates in a numerical order as a return current path.

The invention of Japanese Patent Laid-Open No. 2007-11629 (literature 2) selects a layer to be checked for each layer on which a signal line is wired (to be referred to as a signal layer hereinafter), and extracts a point where a return current path steps over a slit (non-conductive portion) on the selected layer. For each point where the return current path steps over the slit, the invention extracts a bypass capacitor and via located around that point, and checks whether or not the bypass capacitor and via can bypass a return current, in other words, whether or not a bypass exists. Then, the invention checks, based on information indicating a checking range, whether or not the bypass exists within the checking range, in other words, whether or not the bypass is effective.

The invention of Japanese Patent No. 3977638 (literature 3) detects an overlapping area where an enlarged area obtained by enlarging a line width of a signal line by a first coefficient and an area where a potential of each layer is fixed (for example, a ground pattern or power-supply wiring pattern) overlap each other. When the overlapping area is continuous in the enlarged area, a return current path which runs through that enlarged area is searched. On the other hand, when overlapping area is discontinuous in the enlarged area, a return current path, which detours, in a discontinuous portion, a range obtained by enlarging the line width of the signal line by a second coefficient larger than the first coefficient, and runs through the enlarged area in a continuous portion, is searched.

When a return current induced in the neighborhood of a signal line is divided by a slit on a layer (to be referred to as an adjacent layer hereinafter) which is adjacent to a signal layer, it normally flows through an area (to be referred to as a constant potential area hereinafter) where a potential of the signal layer is fixed.

The invention of literature 1 extracts a path which runs through a constant potential area of the signal layer as a candidate of the return current path between return node candidates. However, when the length of a path which detours the slit is shorter than the path which runs through the constant potential area, the invention adopts the path which detours the slit as the return current path. That is, the path which runs close to the signal line is not always preferentially selected as the path where a return current detours a divide portion.

The invention of literature 2 extracts a via and bypass capacitor around a divide portion of the return current path, and checks whether or not a bypass exists and whether or not the bypass is effective. However, the invention does not include any description about a practical bypass deriving method.

The invention of literature 3 does not always derive a return current path on the adjacent layer when there is a discontinuous point (that is, a divide portion of a return current path) in an overlapping area between the enlarged area and the constant potential area of the signal layer. That is, as in the invention of literature 1, a path which runs close to the signal line is not always derived as a path which detours the divide portion of the return current path.

SUMMARY OF THE INVENTION

In one aspect, a design support apparatus for supporting design of a printed circuit board, comprising: an obtaining section, configured to obtain, from a memory, layout information indicating at least locations of components and conductive layers on the printed circuit board, and layouts of conductor patterns on the respective conductive layers and vias which electrically connect between the conductive layers; a first generator, configured to generate path information indicating a path of one signal line with reference to the layout information; a detector, configured to detect a divide portion where a path of a return current corresponding to a signal current of the signal line is divided with reference to the layout information and the path information; and a second generator, configured to generate information indicating a detour path of the return current in a neighborhood of the divide portion with reference to the layout information and the path information.

In another aspect, an information processing method of supporting design of a printed circuit board, comprising: a processor to perform the steps of: obtaining, from a memory, layout information indicating at least locations of components and conductive layers on the printed circuit board, and layouts of conductor patterns on the respective conductive layers and vias which electrically connect between the conductive layers; generating path information indicating a path of one signal line with reference to the layout information; detecting a divide portion where a path of a return current corresponding to a signal current of the signal line is divided with reference to the layout information and the path information; and generating information indicating a detour path of the return current in a neighborhood of the divide portion with reference to the layout information and the path information.

According to these aspects, information indicating a detour path of a return current, which runs close to a signal line at a divide portion where a path of the return current corresponding to a signal of the signal line is divided, can be generated.

Further features of the present invention will become apparent from the following description of exemplary embodiments with reference to the attached drawings.

BRIEF DESCRIPTION OF THE DRAWINGS

FIG. 1 is a block diagram for explaining the arrangement of a computer apparatus used to execute design support processing according to an embodiment.

FIG. 5 is a flowchart for explaining an example of path search processing.

FIGS. 6 and 7 are flowcharts for explaining details of detour path generation processing.

FIG. 14 is a view showing an example of a condition setting screen.

FIG. 19 is a view showing another display example of the detour path.

FIG. 20 is a table showing an example of detour path information.

DESCRIPTION OF THE EMBODIMENTS

Figure 2:
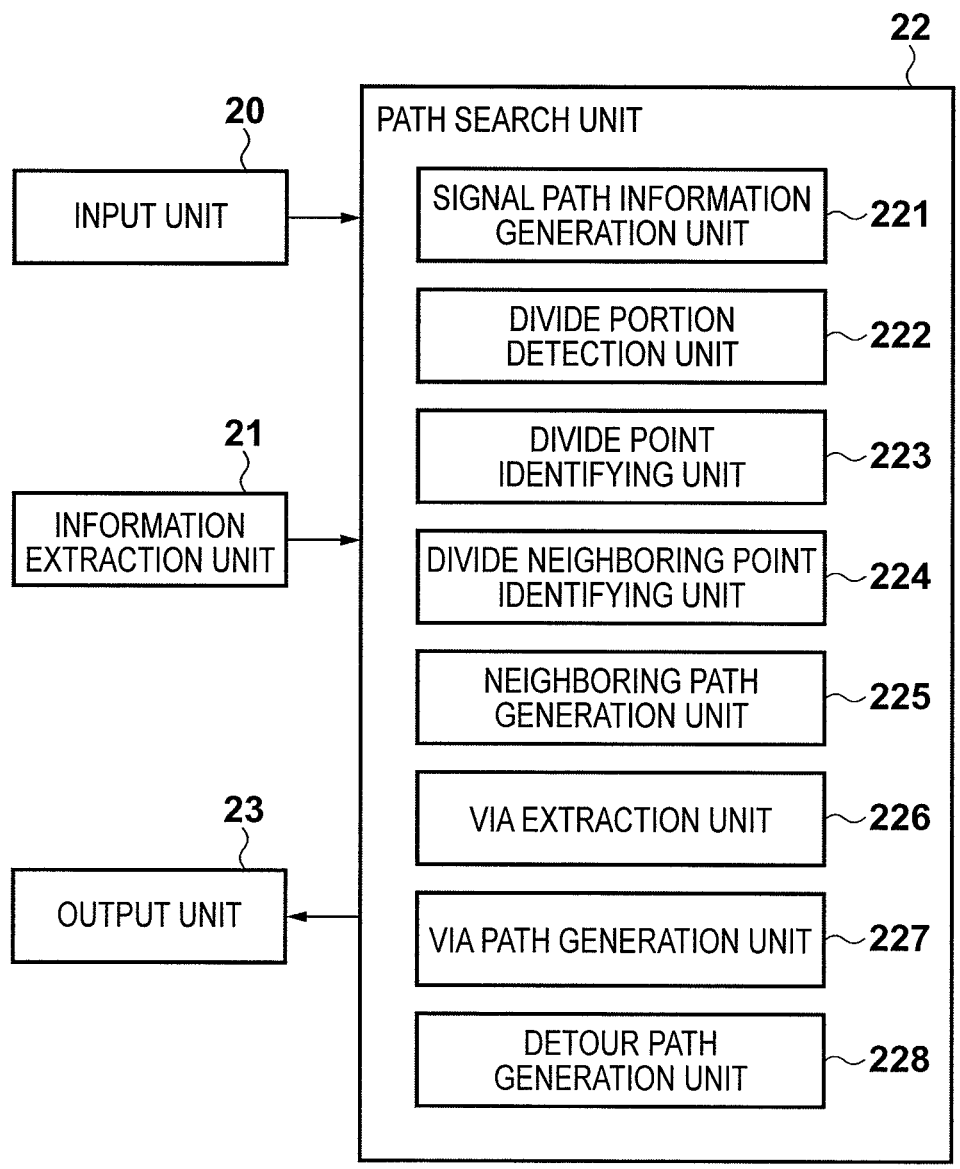
FIG. 2 is a block diagram for explaining the functional arrangement of a support program used to execute the design support processing according to the embodiment.

A design support apparatus and information processing thereof according to embodiments of the present invention will be described in detail hereinafter with reference to the drawings. Note that the following description will be given under the assumption that a path where a return current passes exists on a ground pattern as a conductive wiring pattern of a ground potential, for the sake of simplicity. However, a return current path can exist on constant potential areas such as a power-supply wiring pattern, a potential of which is fixed, and a conductive wiring pattern for an electrostatic shield.

First Embodiment

[Apparatus Arrangement]

The arrangement of a computer apparatus used to execute design support processing of an embodiment will be described below with reference to the block diagram shown in FIG. 1.

A microprocessor (CPU) 101 executes various programs, which are stored in nonvolatile memories such as a read-only memory (ROM) 103 and hard disk drive (HDD) 108, and include an operating system (OS), using a random access memory (RAM) 102 as a work memory, and controls respective units (to be described later) via a system bus 107. Various programs stored in the HDD 108 include a print circuit board design support program (to be described later).

A general-purpose interface (I/F) 104 is, for example, a serial bus interface such as USB (Universal Serial Bus), and is used to connect an input device 111 such as a mouse and keyboard. A video card (VC) 105 is a video interface, and is used to connect a monitor 113 such as a liquid crystal display (LCD). A general-purpose I/F 106 is, for example, a serial bus interface such as USB, and is used to connect an output device such as a printer 114. Note that the general-purpose I/Fs 104 and 106 can be combined into one interface.

The CPU 101 displays a user interface (UI) on the monitor 113. The user inputs instructions and data to the UI by operating the input device 111. The CPU 101 inputs user instructions and data from the input device 111, and executes programs according to these inputs, thus implementing various kinds of processing.

The HDD 108 stores a computer-aided design (CAD) program required to design a print circuit board, layout information associated with the printed circuit board (to be referred to as layout information hereinafter), and information associated with components mounted on the print circuit board (to be referred to as component information hereinafter). Note that the CPU 101 can store the program and information in the HDD 108 by loading them from various recording media using a disk drive and card reader (neither are shown), or obtaining them from a server apparatus via a network (not shown).

Layout Information

The layout information includes the following pieces of information, but they are not always indispensable. The layout information includes:

information associated with a layer configuration and interlayer distances of a print circuit board;

reference designator information of components mounted on the print circuit board (to be referred to as mounted components hereinafter);

mount coordinates of the mounted components;

shapes of the mounted components;

mounted component information (mount coordinates and shapes of pins (terminals) of the mounted components, shapes and signal names of conductor portions to which the pins (terminals) are connected, and the like);

component number information (to be collated with component information) used to identify the mounted components;

signal name/wiring information of inter-component wirings;

via information indicating coordinates, sizes (diameters), and the like of conductive portions which electrically connect between layers;

drill hole information (coordinates and shapes of drill holes, and the like);

metal exposure information (coordinates of points indicating metal exposure areas, and the like); and circuit board outline information (coordinates of points that configure an outline of the printed circuit board, and the like).

Note that in the following description, a conductor portion to which a pin of a mounted component is connected will be referred to as a "pad". Also, the wiring information of inter-component wirings includes positions and widths of wirings, coordinates of vertices (to be referred to as configuration points hereinafter) of patterns which configure wirings, and the like.

Component Information

The component information includes the following pieces of information and the like, but they are not always indispensable. Also, the component information can be obtained from a component database (DB) via a network. The component information includes:

- component number information (information associated with components at the time of print circuit board design; used to identify numbers unique to components);
- material information (indicating materials that configure components);
- component name information (names such as "connector", "resistor", "IC", and the like); and
- pin information (indicating pins (terminals) such as a power supply pin, ground pin, input/output pin, and the like).

[Support Program]

The functional arrangement of a support program used to execute the design support processing of this embodiment will be described below with reference to the block diagram shown in FIG. 2. The support program is a part of the CAD program required to design a print circuit board, and the functional arrangement shown in FIG. 2 is implemented when the CPU 101 executes the support program.

An input unit 20 inputs various instructions and data, which are input by the user by operating the input device 111, to a path search unit 22. When input instructions of the layout information and component information are issued via the input unit 20, an information extraction unit 21 reads out the instructed information from the HDD 108, and inputs the readout information to the path search unit 22. The path search unit 22 has the following eight functional units. Note that pieces of information generated by the eight functional units are stored in predetermined areas of the RAM 102 and HDD 108, so as to allow these functional units to mutually refer to these pieces of information.

A signal path information generation unit 221 generates path information of a signal line as a derivation target of a return current path with reference to the layout information. Note that the path information of the signal line indicates an order of conductor lines, conductor planes, and vias, which configure a wiring that runs from a certain component pin to another component pin, their outlines, and layers where they are located.

A divide portion detection unit 222 extracts information of a layer where a conductor line or conductor plane, extracted from the path information of the signal line, is located, and outline information of a ground pattern of a conductive layer (to be referred to as an adjacent layer hereinafter), which is adjacent to a conductive layer (to be referred to as a signal layer hereinafter) where the signal line is wired from the layout information. Then, the divide portion detection unit 222 detects a divide portion, at which a return current path is divided, from outline information of the conductor line or conductor plane of the path of the signal line and that of the ground pattern of the adjacent layer.

As will be described in detail later, a divide point identifying unit 223 identifies start and end points of division of a return current path based on the path information of the signal line and a coordinate of a divide portion, and generates a divide point pair including one of the identified points as a first divide point and the other as a second divide point.

A divide neighboring point identifying unit 224 extracts outline information of a ground pattern on the signal layer from the layout information, and identifies points on the ground pattern, which are located in the neighborhood of the respective divide points. Then, the divide neighboring point identifying unit 224 generates a divide neighboring point pair including a point corresponding to the first divide point of the divide point pair as a first divide neighboring point and a point corresponding to the second divide point as a second divide neighboring point.

A neighboring path generation unit 225 generates a neighboring path, which runs inside the ground pattern and close to the path of the signal line, and joins the divide neighboring point pair, based on the path information of the signal line, the outline information of the ground pattern of the signal layer, and coordinates of the divide neighboring point pair. Note that the neighboring path is expressed by information indicating a start point, end point, bent points, and layer of the path.

A via extraction unit 226 extracts coordinates of a via (to be referred to as a ground via hereinafter), which electrically connects at least ground patterns of both the signal layer and adjacent layer, from the layout information. Note that one or a plurality of ground vias are detected.

A via path generation unit 227 calculates a via path RA1, which joins the first divide point and ground via in the ground pattern of the adjacent layer, based on the outline information of the ground pattern of the adjacent layer, coordinates of the first divide point, and coordinates of the extracted ground via. Also, the via path generation unit 227 calculates a via path RA2, which joins the first divide neighboring point and ground via in the ground pattern of the signal layer, based on the outline information of the ground pattern of the signal layer, coordinates of the first divide neighboring point, and coordinates of the extracted ground via. Then, the via path generation unit 227 generates a first via path which joins the via paths RA1 and RA2, which have the identical ground via as a start or end point.

Furthermore, the via path generation unit 227 calculates a via path RB1, which joins the second divide point and ground via in the ground pattern of the adjacent layer, based on the outline information of the ground pattern of the adjacent layer, coordinates of the second divide point, and coordinates of the extracted ground via. Also, the via path generation unit 227 calculates a via path RB2, which joins the second divide neighboring point and ground via in the ground pattern of the signal layer, based on the outline information of the ground pattern of the signal layer, coordinates of the second divide neighboring point, and coordinates of the extracted ground via. Then, the via path generation unit 227 generates a second via path which joins the via paths RB1 and RB2, which have the identical ground via as a start or end point.

A detour path generation unit 228 generates a detour path which joins the divide neighboring path and the first and second via paths.

An output unit 23 outputs the detour path generated by the detour path generation unit 228 as a search result of the path search unit 22. Note that the output of the search result includes, for example, display of the detour path as the search result on the monitor 113, and recording of the detour path as the search result in a predetermined area of the HDD 108 in association with the signal line. Furthermore, the output unit 23 can output an evaluation result of the detour path by the path search unit 22, and can display it on, for example, the monitor 113.

Layout Example of Printed Circuit Board

Figure 3:
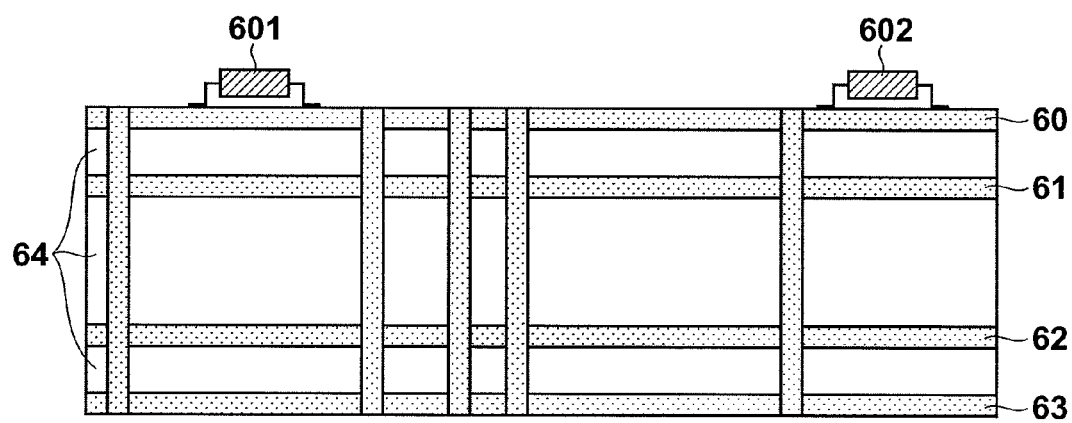
FIG. 3 and FIGS. 4A to 4D are views showing an example of layout information of a printed circuit board.
Figure 4A:
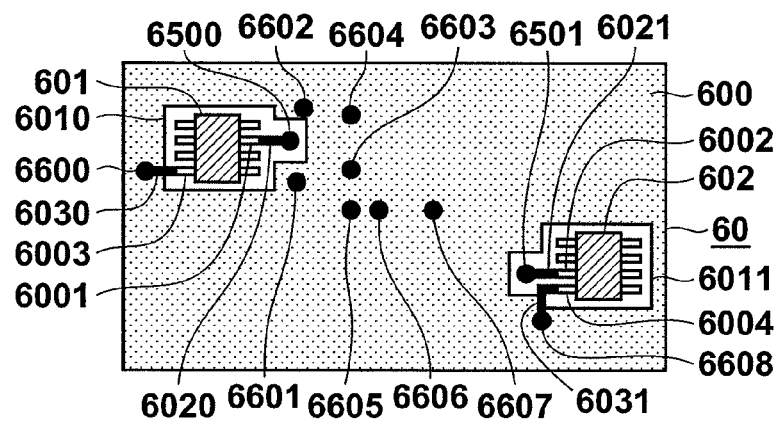
Figure 4B:
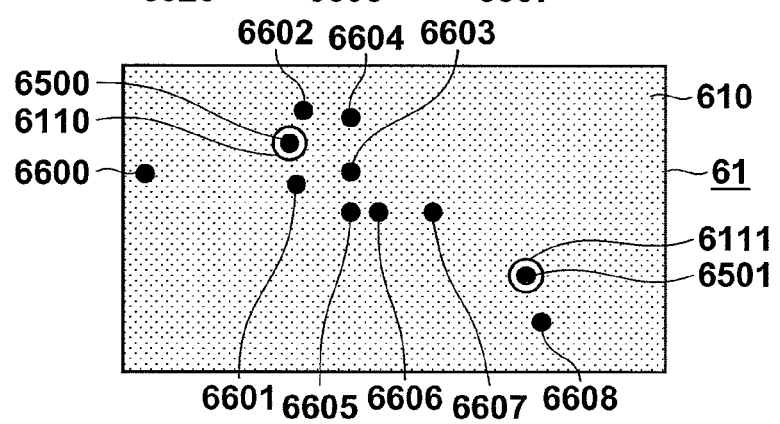
Figure 4C:
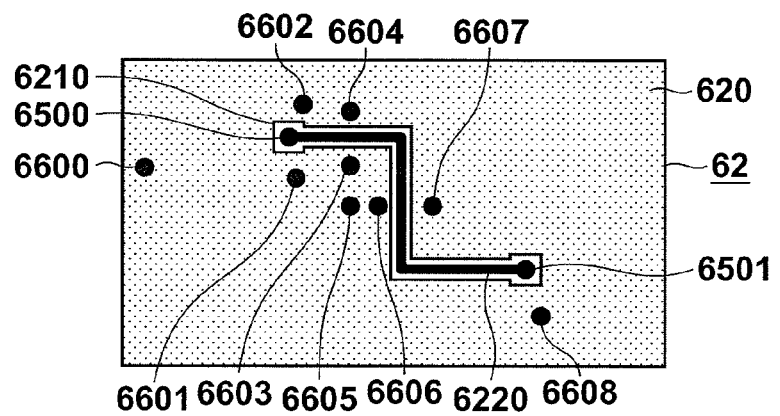
Figure 4D:
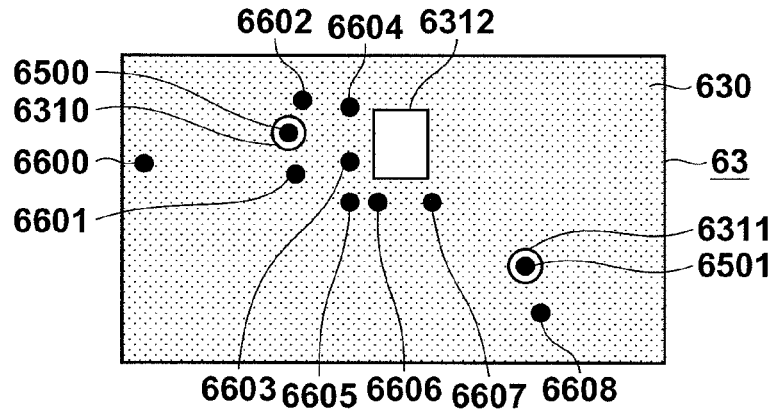

FIG. 3 and FIGS. 4A to 4D show an example of layout information of a printed circuit board. As shown in FIG. 3, the printed circuit board is a four-layered circuit board having four conductive layers 60, 61, 62, and 63. These conductive layers are electrically insulated from each other by insulating layers 64.

FIGS. 4A to 4D show the states of the conductive layers 60 to 63 when viewed from the component mount surface side, with the conductive layers having ground patterns 600, 610, 620, and 630, respectively. A pin 6001 of an electronic component 601 is electrically connected to a pin 6002 of an electronic component 602 through a signal line 6020, a via 6500 (conductive layer 60), the via 6500, a signal line 6220, a via 6501 (conductive layer 62), the via 6501, and a signal line 6021 (conductive layer 60). A via used as a signal path will be referred to as a "signal via" hereinafter.

A pin 6003 of the electronic component 601 is electrically connected to the ground pattern 600 through a signal line 6030. Likewise, a pin 6004 of the electronic component 602 is electrically connected to the ground pattern 600 through a signal line 6031.

In FIGS. 4A to 4D, blank areas 6010, 6011, 6110, 6111, 6210, 6310, 6311, and 6312 indicate insulations between the signal lines and ground patterns. Especially, the insulation 6312 is located at a position where it divides a projected path when a path of the signal line 6220 is projected onto the conductive layer 63.

Also, vias 6600, 6601, 6602, 6603, 6604, 6605, 6606, and 6608 indicated by black dots in FIGS. 4A to 4D are those used to electrically connect the ground patterns 600, 610, 620, and 630. These vias which electrically connect the ground patterns each other are "ground vias".

Path Search Processing

An example of the path search processing will be described below with reference to the flowchart shown in FIG. 5.

Upon reception of an execution instruction of the path search processing through the input unit 20, the path search unit 22 controls the information extraction unit 21 to obtain layout information of a printed circuit board as a target of the path search processing (S301). Then, the path search unit 22 controls the signal path information generation unit 221 to select one of signal lines included in the layout information (S302).

The user inputs information required to identify a printed circuit board to be processed through the input unit 20. The user may input information indicating a signal line to be processed or may select a signal line to be processed through the input unit 20. The user selects the signal line to be processed by selecting, for example, a signal name or wiring name or by selecting a pin of a component located on the printed circuit board.

Next, the path search unit 22 controls the signal path information generation unit 221 to extract conductor lines, conductor planes, and vias of the selected signal line, pads of pins of components connected to the signal line, and pieces of their outline information from the layout information (S303).

The path search unit 22 then controls the signal path information generation unit 221 to identify a connection order of the pins of the components, conductor lines, conductor planes, and signal vias in a signal path based on the connection relationship of the extracted conductor lines, conductor planes, vias, and pads. Then, the path search unit 22 then controls the signal path information generation unit 221 to generate path information of the signal line indicating the pieces of outline information and connection order of the conductor lines, conductor planes, signal vias, and pads (S304).

As will be described in detail later, the path search unit 22 controls the functional units from the divide portion detection unit 222 to the detour path generation unit 228 to generate a detour path in a return current path corresponding to the selected signal line from the path information of the signal line and the layout information (S305).

The path search unit 22 checks whether or not the generation of the detour path has succeeded (S306). If the generation of the detour path has succeeded, the path search unit 22 controls the output unit 23 to output detour path information indicating the generated detour path (S307). The detour path information indicates connections of feature points represented by divide points, divide neighboring points, ground vias, bent points, and the like, which are to be detoured by a return current path between the divide point pair identified by the divide point identifying unit 223.

As the output method of the detour path information, for example, an image including the color-coded layout of respective layers and detour path can be displayed on the monitor 113. Alternatively, a return current path, which combines portions (non-divide portions), which are not divided, and the detour path of the path obtained by projecting the signal line onto the adjacent layer, may be displayed on the monitor 113. When the detour path information is recorded on, for example, the HDD 108, it can be recorded as a file of a format that describes coordinates of feature points and layers included in the detour path information as character strings in the order of the path.

On the other hand, if the generation of the detour path has failed, the path search unit 22 controls the output unit 23 to output a warning indicating that the generation of the detour path has failed (S308). In this case, at least a portion of the detour path is not generated (for example, the divide neighboring point identifying unit 224 fails to identify any divide neighboring points, the neighboring path generation unit 225 fails to generate any neighboring path, the via extraction unit 226 fails to extract any ground vias, or the via path generation unit 227 fails to generate any via paths).

As the output method of the warning, for example, divide point pair identified by the divide point identifying unit 223 or that for which the detour path cannot be generated of the signal line can be displayed on the monitor 113. Alternatively, causes of the generation failure of the detour path (for example, an identification failure of the divide neighboring points, a generation failure of the neighboring path, an extraction failure of the ground vias, or a generation failure of the via paths has occurred) may be displayed. Also, a file of a format that describes a signal name or wiring name which has caused the generation failure of the detour path, coordinates of a divide point pair, causes, and the like may be recorded in, for example, the HDD 108.

The path search unit 22 checks whether or not the generation of detour paths for all signal lines (or those designated by the user) is complete (S309). If the generation of detour paths is not complete yet, the process returns to step S302 to repeat the processes in steps S302 to S308 until the generation of detour paths for all the signal lines is complete.

Generation of Detour Path

The detour path generation processing (S304) will be described in detail below with reference to the flowcharts shown in FIGS. 6 and 7.

The divide portion detection unit 222 identifies an adjacent layer from the path information of the signal line (S401), and extracts outline information of a ground pattern of the adjacent layer from the layout information (S402). Then, the divide portion detection unit 222 projects the path of the signal line onto the adjacent layer based on the path information of the signal line, and detects a divide portion, which divide the projected path and depend on insulation of the adjacent layer, based on the outline information of the ground pattern (S403). In other words, the divide portion detection unit 222 detects, as a divide portion, an area (crossing) where the projected path and the insulation which exists (or is located on) the adjacent layer cross.

The divide portion detection unit 222 detects a divide portion based on intersections between each conductor line indicated by the path information of the signal line and edges of the ground pattern, that is, an intersection where the conductor line goes outside the ground pattern and that where it comes inside the ground pattern. For example, the divide portion is a middle point between the intersections.

When a signal wiring has a conductor plane, the divide portion detection unit 222 detects intersections between edges of the conductor plane indicated by the path information of the signal line and those of the ground pattern. In this case, for example, when the conductor plane has a rectangular outline extending in the transmission direction of a signal, the divide portion detection unit 222 detects a divide portion based on a midpoint of a line segment which joins two intersections where two edges along the transmission direction of the signal go outside the ground pattern and that of a line segment which joins two intersections where they come inside the ground pattern. For example, the divide portion is a center of an area where the conductor plane is overlaid on the insulation.

Note that when a whole return current path is to be displayed in the output step (S306) of the detour path information, information indicating the projected path is stored in the RAM 102 or HDD 108 in step S403.

Next, the divide portion detection unit 222 checks whether or not the divide portion is detected (S404). If no divide portion is detected, since the return current path does not detour, the detour path generation processing ends. In other words, when no divide portion is detected, the projected path is the return current path.

After the divide portion is detected, the divide point identifying unit 223 identifies divide point pairs from the path information of the signal line, the divide portion, and the outline information of the ground pattern of the adjacent layer (S405). The divide point identifying unit 223 identifies, as a divide point pair, an intersection (or midpoint) where the signal line goes outside the ground pattern and an intersection (or midpoint) where the signal line which goes outside the ground pattern comes inside the ground pattern. Then, the divide point identifying unit 223 sets one point as a first divide point and the other as a second divide point.

Next, the divide neighboring point identifying unit 224 selects one of the identified divide point pairs (S406). In this case, assume that a divide point pair including divide points A and B is selected. Subsequently, the divide neighboring point identifying unit 224 extracts outline information of a ground pattern of the signal layer from the layout information (S407), and identifies points A1 and B1 (divide neighboring point pair) which are located inside the ground pattern of the signal layer and in the neighborhood of the divide points A and B (S408).

The divide neighboring point identifying unit 224 draws a line perpendicular to the signal line from each divide point, and selects, as a divide neighboring point, an intersection closest to the divide point of those between the line and edges of the ground pattern of the signal layer. Also, the following divide neighboring point identifying methods are available.

A predetermined width is given to a line to be drawn from a divide point, and an arbitrary vertex or center of an overlapping area between the line and the ground pattern of the signal layer is selected as a divide neighboring point.

A nearest neighbor point from a divide point in the ground pattern of the signal layer is calculated, and is set as a divide neighboring point.

A minimum interval of an interwiring space is extracted from the layout information, and a vertex, center, or barycenter of an overlapping area between the ground pattern of the signal layer and an area of a range, which has the divide point as the center, and is obtained by multiplying the minimum interval by a predetermined coefficient, is set as a divide neighboring point.

A vertex, center, or barycenter of an overlapping area between the ground pattern of the signal layer, and an area of a range, which has a divide point as the center, of a distance (interlayer distance) between wiring layers, which are closest to the signal layer and exclude the adjacent layer and signal layer, is selected as a divide neighboring point.

Next, the divide neighboring point identifying unit 224 checks whether or not the identification of the divide neighboring point pair has succeeded (S409). If the identification of the divide neighboring point pair has failed, the process jumps to step S423.

After the divide neighboring point pair is identified, the neighboring path generation unit 225 generates, based on the path information of the signal line, divide neighboring point pair, and outline information of the ground pattern of the signal layer, a neighboring path which runs inside the ground pattern and close to the path of the signal line, and joins the divide neighboring point pair (S410).

The neighboring path generation unit 225 selects, as a neighboring path, a path, which runs closer to the signal line of two paths which extend from the divide neighboring point A1 and reach the divide neighboring point B1 along the edges of the ground pattern of the signal layer. Alternatively, a signal line corresponding to that between the divide points A and B is divided into segments, and then positions, which are closest to the segments, on the edge of the ground pattern of the signal layer, are calculated, and the edge of the ground pattern indicated by these positions may be selected as a neighboring path.

Then, the neighboring path generation unit 225 checks whether or not the generation of the neighboring path has succeeded (S411). If the generation of the neighboring path has failed, the process jumps to step S423. Note that the generation of the neighboring path fails, for example, when the ground pattern of the signal layer includes a plurality of completely isolated patterns between the divide neighboring points A and B.

After the neighboring path is generated, the via extraction unit 226 extracts one or a plurality of ground vias, which electrically connect at least the ground patterns of the signal layer and adjacent layer, from the layout information (S412). The via extraction unit 226 checks whether or not the extraction of the ground vias has succeeded (S413). If the extraction of the ground vias has failed, the process jumps to step S423.

After the ground via is extracted, the via path generation unit 227 generates, based on the divide point A, the extracted ground via, and the outline information of the ground pattern of the adjacent layer, a via path RA1 which runs through the ground pattern of the adjacent layer, and joins the divide point A and the ground via (S414). Subsequently, the via path generation unit 227 generates, based on the divide neighboring point A1, the extracted ground via, and the outline information of the ground pattern of the signal layer, a via path RA2 which runs through the ground pattern of the signal layer, and joins the divide neighboring point A1 and the ground via (S415). Then, the via path generation unit 227 generates a via path A2 by joining the via paths RA1 and RA2, which have the identical ground via as a start or end point (S416).

Next, the via path generation unit 227 generates, based on the divide point B, the extracted ground via, and the outline information of the ground pattern of the adjacent layer, a via path RB1 which runs through the ground pattern of the adjacent layer, and joins the divide point B and the ground via (S417). Subsequently, the via path generation unit 227 generates, based on the divide neighboring point B1, the extracted ground via, and the outline information of the ground pattern of the signal layer, a via path RB2 which runs through the ground pattern of the signal layer, and joins the divide neighboring point B1 and the ground via (S418). Then, the via path generation unit 227 generates a via path B2 by joining the via paths RB1 and RB2, which have the identical ground via as a start or end point (S419).

Note that when a plurality of ground vias are extracted, the via path generation unit 227 selects, as via paths, paths having the shortest path lengths of those obtained by joining via paths RA1 and RA2 and via paths RB1 and RB2, which have the identical ground vias as start or end points.

Then, the via path generation unit 227 checks whether or not generation of the via paths A2 and B2 has succeeded (S420). If the generation of one of the via paths A2 and B2 has failed, the process jumps to step S423.

After the via paths A2 and B2 are generated, the detour path generation unit 228 generates a detour path between the divide points A and B based on the neighboring path and the via paths A2 and B2 (S421). Note that information indicating the detour path is stored in the RAM 102 or HDD 108 in association with the signal line and divide portion.

After the detour path is generated, the path search unit 22 checks whether or not the generation of detour paths for all divide point pairs is complete (S422). If divide point pairs to be selected still remain, the process returns to step S406 to repeat the processes in steps S406 to S422 until no divide point pair to be selected remains.

On the other hand, if an identification failure of the divide neighboring point pair, a generation failure of the neighboring path, an extraction failure of the ground via, or a generation failure of one of the via paths A2 and B2 occurs, the detour path generation unit 228 generates warning information (S423). The warning information includes a signal name or wiring name of the signal line which has caused the generation failure of the detour path, information indicating the divide portion, causes of the generation failure of the detour path, and the like.

[Practical Example of Path Search Processing]

An example of carrying out the path search processing on the printed circuit board having the layout information shown in FIGS. 4A to 4D will be described below.

Upon starting the path search processing, the path search unit 22 obtains the layout information of the printed circuit board shown in FIGS. 4A to 4D (S301), and selects one of signal lines (S302). On the layout shown in FIGS. 4A to 4D, a signal line, which connects the pin 6001 of the electronic component 601 and the pin 6002 of the electronic component 602, is selected. Assume that a signal name of this signal line is "net-A".

Next, the path search unit 22 generates path information of the signal line (S303, S304). That is, the signal path information generation unit 221 extracts the following conductors having the signal name net-A from the layout information, and generates the path information of the signal line net-A by tracing their connection relationship in turn:
  pins (pads) 6001 and 6002;
  conductor lines 6020, 6021, and 6220; and
  signal vias 6500 and 6501.

That is, the path information of the signal line, which is obtained in this processing, indicates the coordinates and layers in the order of the pad 6001→conductor line 6020→signal via 6500→conductor line 6220→signal via 6501→conductor line 6021→pad 6002. Note that as the example of the path information of the signal line, pieces of information of conductors which configure the signal line are arranged in turn. Alternatively, for example, the information may have a format which adds codes indicating an order to pieces of information of conductors. Of course, the path information of the signal line may be generated to have the pad 6002 as a start point.

Figure 8:
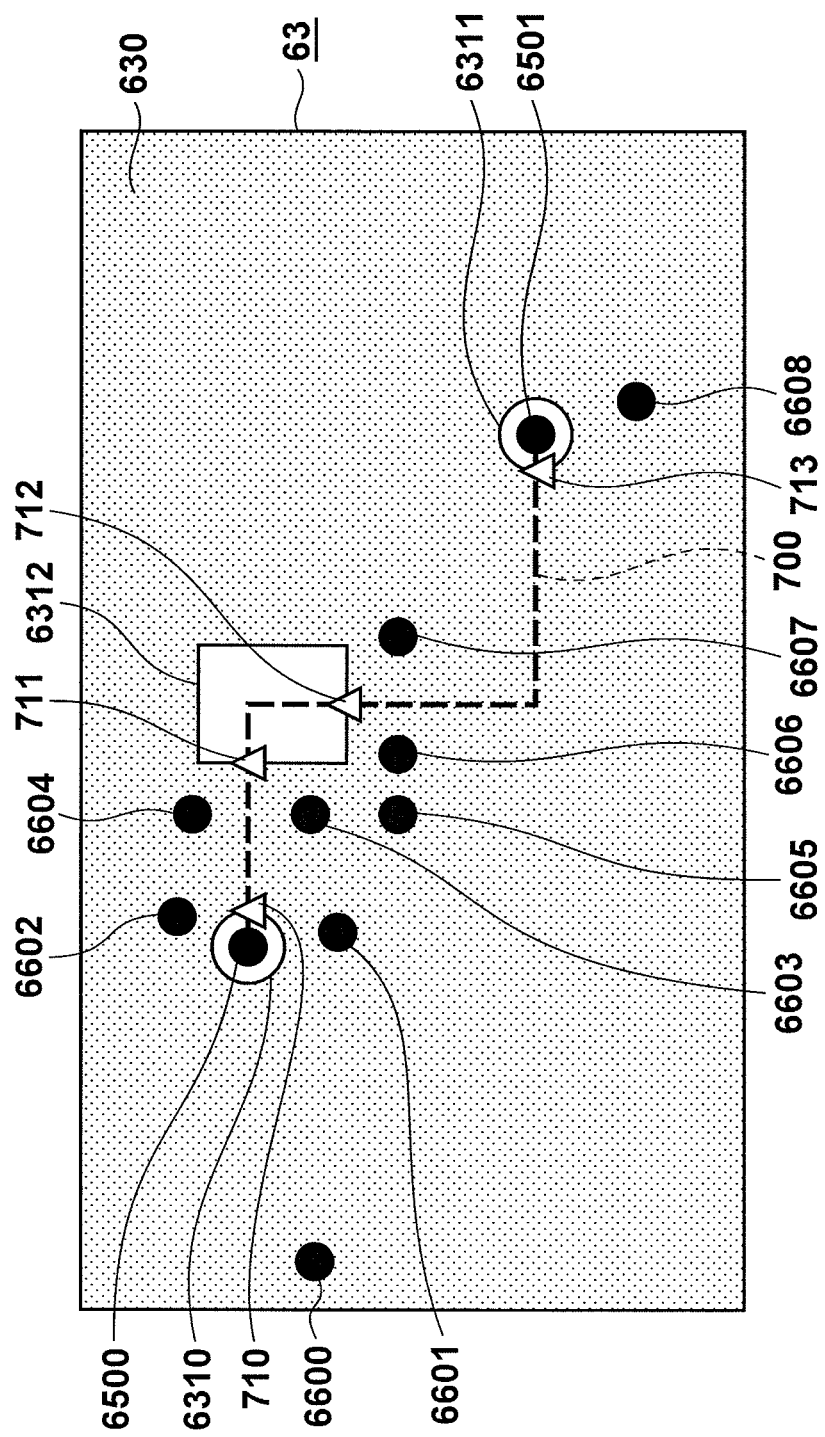
FIG. 8 is a view for explaining a projected path.

Next, the path search unit 22 controls the divide portion detection unit 222 to detect a divide portion (S401 to S404). In this case, the conductor line 6220 of the signal line net-A is selected as a conductor line of interest, and the conductive layer 63 is selected as the adjacent layer. A projected path will be described below with reference to FIG. 8. FIG. 8 shows a projected path 700 indicated by a broken line.

The divide portion detection unit 222 extracts the following pieces of information as the outline information of the ground pattern 630 of the conductive layer 63 from the layout information:
  edges indicating an outline of the ground pattern 630;
  edges corresponding to shapes of the insulations 6310 and 6311 which surround the signal vias 6500 and 6501; and
  edges corresponding to a shape of the insulation 6312.

Therefore, the divide portion detection unit 222 detects, as a divide portion, intersections 710, 711, 712, and 713 between the projected path 700 and the edges corresponding to the shapes of the insulations 6310, 6311, and 6312.

The path search unit 22 controls the divide point identifying unit 223 to identify a divide point pair (S405). The divide point identifying unit 223 identifies, as a divide point pair, the intersection where the projected path goes outside the ground pattern 630 and that where it comes inside the ground pattern 630 of the intersections 710 to 713, which are detected as the divide portion. That is, the divide point identifying unit 223 identifies, as a divide point pair, the intersection 711 where the projected path goes outside the ground pattern and the intersection 712 where it comes inside the ground pattern.

Note that the intersection 710 is identified as a divide point pair with an intersection divided by the insulation 6110 of the conductive layer 61, and the intersection 713 is similarly identified as a divide point pair with an intersection divided by the insulation 6111 of the conductive layer 61. As for these divide point pairs, ground vias which electrically connect the conductive layers 61 and 63 are extracted, and paths which join the divide point pairs through the extracted ground vias are calculated. However, a detailed description about the generation of detour paths of these divide pairs will not be given.

Next, the path search unit 22 controls the divide neighboring point identifying unit 224 to select one of the divide point pairs (S406). In this example, the divide points 711 and 712 are selected as a divide point pair. Then, the divide neighboring point identifying unit 224 identifies divide neighboring points in the ground pattern of the signal layer respectively for the divide points 711 and 712 (S407 to S409).

Figure 9A:
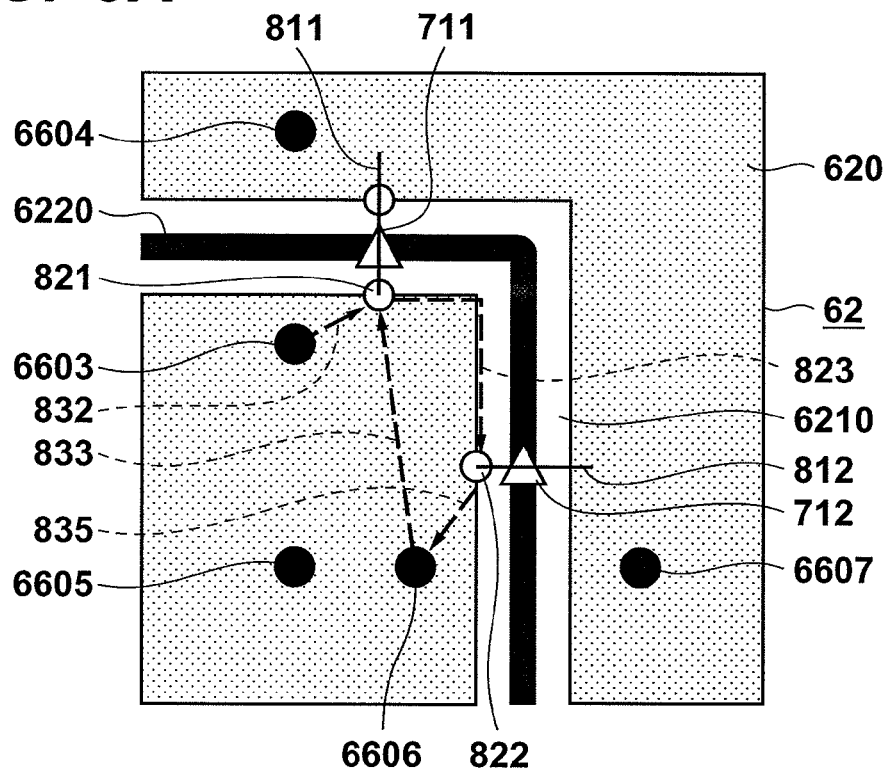
FIGS. 9A and 9B are views showing enlarged states around a divide portion on conductive layers.
Figure 9B:
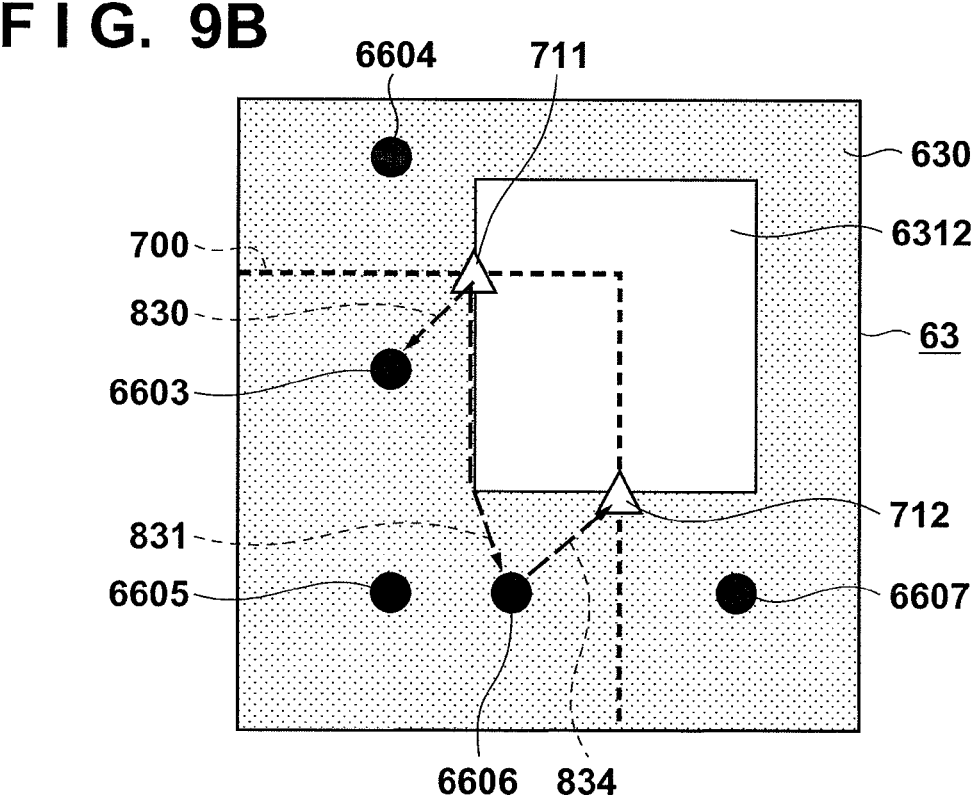

FIGS. 9A and 9B show enlarged states around a divide portion on the conductive layers 62 and 63. The divide neighboring point identifying unit 224 extracts the ground pattern 620 and insulation 6210 of the signal layer from the layout information. Then, as shown in FIG. 9A, the divide neighboring point identifying unit 224 calculates a line 811 perpendicular to the signal line 6220 from the divide point 711, searches for intersections between the line 811 and edges of the ground pattern 620, and sets an intersection closest to the divide point 711 as a divide neighboring point 821. Likewise, the divide neighboring point identifying unit 224 calculates a line 812 perpendicular to the signal line 6220 from the divide point 712, searches for intersections between the line 812 and the edges of the ground pattern 620, and sets an intersection closest to the divide point 712 as a divide neighboring point 822.

Next, the path search unit 22 controls the neighboring path generation unit 225 to generate a neighboring path between the divide neighboring points 821 and 822 (S410, S411). As shown in FIG. 9A, the neighboring path generation unit 225 extracts shape information of the insulation 6210, and generates, as a neighboring path, a path 823 which extends from the divide neighboring point 821 and reaches the divide neighboring point 822 along an edge of the insulation 6210. Since the neighboring path is generated along the edge of the ground pattern or insulation, the neighboring path which is closest to the signal line can be generated within a short period of time.

Next, the path search unit 22 controls the via extraction unit 226 to extract ground vias which electrically connect at least the ground patterns of the signal layer and those of the adjacent layer (S412, S413). The via extraction unit 226 extracts the ground vias 6600 to 6608, which have the same potential as the divide points 711 and 712, and electrically connect the ground patterns 620 of the signal layer and 630 of the adjacent layer.

Next, the path search unit 22 controls the via path generation unit 227 to generate via paths which go through any of the ground vias between the divide point 711 and divide neighboring point 821 and between the divide point 712 and divide neighboring point 822 (S414 to S420). A generation example of a via path which extends from the divide point 711 and reaches the divide neighboring point 821 will be described below.

The via path generation unit 227 derives paths which extend from the divide point 711 and reach the respective ground vias 6600 to 6608 based on pieces of outline information indicating outlines of the ground pattern 630 of the conductive layer 63 on which the divide point 711 exists and the insulation (slot) 6312. FIG. 9B shows paths 830 and 831 which extend from the divide point 711 and reach the ground vias 6603 and 6606. Note that a path is preferably a shortest path along the surface of the ground pattern 630. Also, the processing time can be shortened by deriving a shortest path by omitting insulations having smaller areas of those surrounded by the ground pattern 630.

Next, the via path generation unit 227 derives paths which extend from a divide point 721 and reach the ground vias 6600 to 6608 based on pieces of outline information indicating outlines of the ground pattern 620 and insulation 6210 of the conductive layer 62 where the divide neighboring point 821 exists. FIG. 9A shows paths 832 and 833 which extend from the divide neighboring point 821 and reach the ground vias 6603 and 6606.

Next, the via path generation unit 227 joins paths having the identical ground via as a start or end point. For example, the via path generation unit 227 joins the path 832 having the ground via 6603 as a start point and the path 830 having the ground via 6603 as an end point, and also joins the path 833 having the ground via 6606 as a start point and the path 831 having the ground via 6606 as an end point. The via path generation unit 227 compares path lengths of the joined paths, and selects, as the via path A2, the shortest path, that is, which is obtained by joining the paths 832 and 830. Likewise, the via path generation unit 227 selects, as the via path B2 which extends from the divide point 712 and reaches the divide neighboring point 822, a path which is obtained by joining paths 834 and 835 that go through the ground via 6606.

The path search unit 22 controls the detour path generation unit 228 to generate a detour path by joining the neighboring path 823 and the via paths A2 and B2 (S421). In the layout example shown in FIGS. 4A to 4D, since the generation of detour paths for all the divide point pairs is complete, the detour path generation processing (S305) ends based on the checking result in step S422, and the path search unit 22 outputs detour path information (S307).

Figure 10:
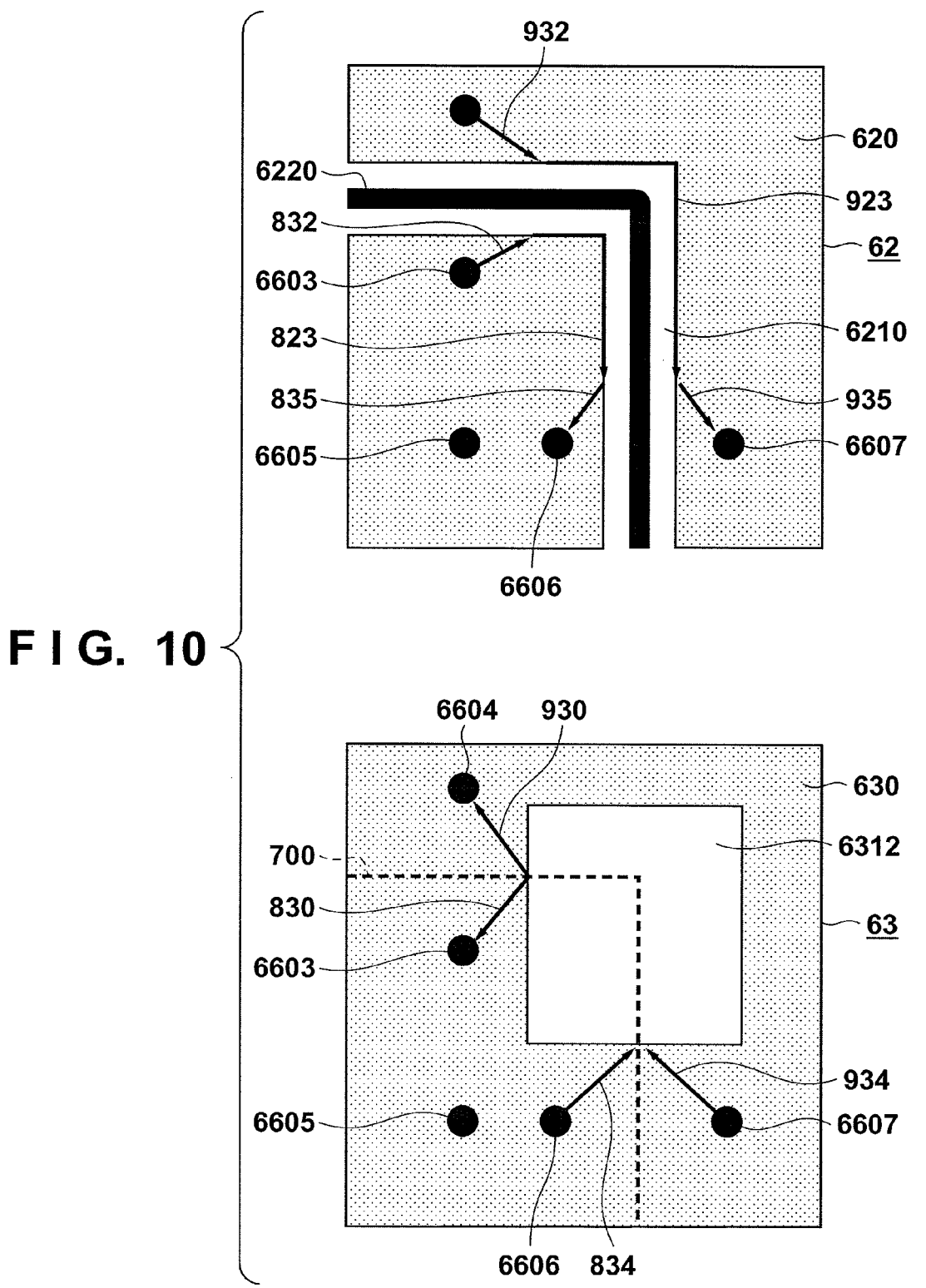
FIG. 10 is a view showing a display example of a detour path.

FIG. 10 shows a display example of the detour path. Note that the detour path is generated by joining the paths 830, 832, 823, 835, and 834 in the example shown in FIGS. 9A and 9B. FIG. 10 shows a generation example of detour paths on the ground pattern 620 on both the right and left sides of the signal line 6220. That is, FIG. 10 shows enlarged views around a divide portion by adding a detour path obtained by joining paths 930, 932, 923, 935, and 934. In general, distances to the ground pattern on the right and left sides of the signal line are equal to each other, and nearly equal return currents are generated on the two sides of the signal line. Therefore, as shown in FIG. 10, it is preferable to generate the detour paths on the right and left sides of the signal line 6220.

Figure 11:
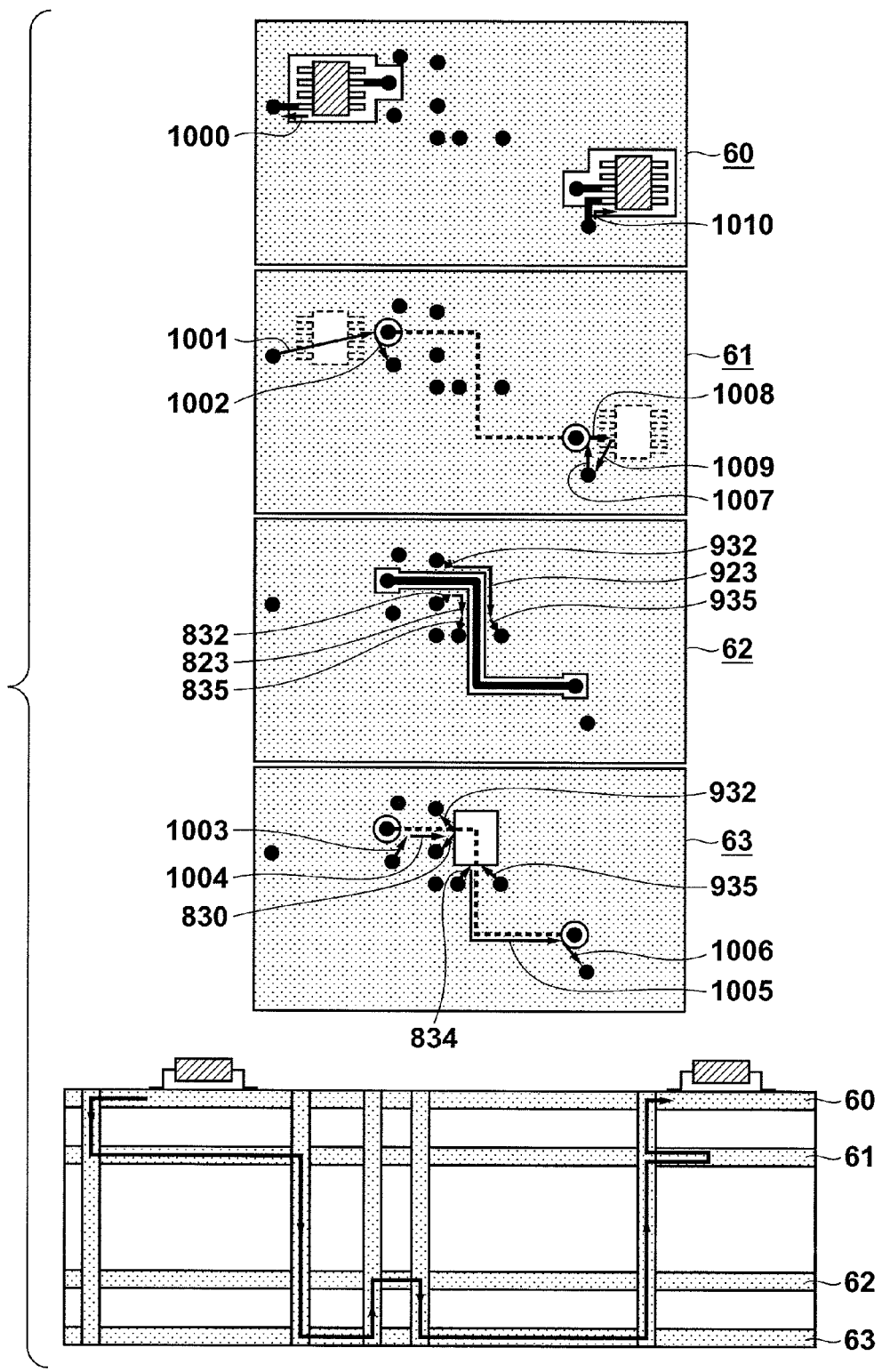
FIG. 11 is a view showing another display example of the detour path.

FIG. 11 shows another display example of the detour path. As shown in FIG. 11, the projected path (broken line) of the signal line, and a whole return current path which joins from a ground pin of the component to the end point of the projected path of the signal line may be displayed. That is, in addition to the detour paths shown in FIG. 10, paths 1000, 1001, 1002, 1003, 1004, 1005, 1006, 1007, 1008, 1009, and 1010 may be displayed.

In the layout example shown in FIGS. 4A to 4D, since the detour paths are generated for all the signal lines, the path search unit 22 ends the path search processing based on the checking result in step S309.

Modification of Embodiment

In the example of the above description, the conductive layer 63 is set as the adjacent layer of the signal layer 62. Also, as the adjacent layer setting method, the following methods are available.

For example, the conductive layers 61 and 63 may be set as adjacent layers of the signal layer 62, and a divide portion on both the adjacent layers may be detected.

Also, adjacent layers may be set based on interlayer distances from the signal layer, and the distance between the signal line and the ground pattern on the signal layer. For example, as shown in FIG. 3, assume that interlayer distances between the conductive layers 60 and 61, conductive layers 61 and 62, and conductive layers 62 and 63 are respectively 100 µm, 1000 µm, and 100 µm. Initially, pieces of outline information of the signal line 6220, ground pattern 620, and insulation 6210 of the conductive layer 62 are obtained from the layout information. Then, from the pieces of outline information of the signal line 6220 and ground pattern 620, a distance between them is calculated (for example, 150 µm). Also, interlayer distances are extracted from the layout information.

Then, the conductive layers are selected in turn as a detection target of a divide portion in ascending order of distance. In this example, the detection target of the divide portion is selected in the order of the conductive layer 63 (adjacent layer) having the distance=100 μm, the conductive layer 62 (signal layer) having the distance=150 μm, the conductive layer 61 having the distance=1000 μm, and the conductive layer 60 having the distance over 1100 μm. For example, when the generation of a detour path on the conductive layer 62 (signal layer) has failed, the generation of a detour path on the conductive layer 61 is attempted. When this generation has also failed, the generation of a detour path on the conductive layer 60 is attempted. Of course, when the generation of detour paths on all the conductive layer has failed, a warning is generated.

In this case, the aforementioned path search processing can be applied to detour paths on conductive layers other than the signal layer. That is, on a ground pattern of a detour path generation target layer, divide neighboring points are identified in the neighborhood of divide points. For example, when projected positions of the divide points are located inside the ground pattern of the detour path generation target layer, the projected positions of the divide points can be set as divide neighboring points. Otherwise, points closest to the divide points or those which are not closest to the divide points but are located in the neighborhood of a projected path of the signal line may be selected as divide neighboring points. Then, a path along the projected path on the ground pattern of the detour path generation target layer may be set as a neighboring path.

When one or more conductive layers are sandwiched between the detour path generation target layer and the signal layer, a shortest path between the divide neighboring points and along the surface of the ground pattern of the detour path generation target layer may be set as a neighboring path.

When potentials of ground patterns (or power-supply wiring patterns), where two divide points identified as a divide point pair exist, are different on each other, divide neighboring points are set as follows. Initially, a passive component which joins these two potentials is extracted from the layout information. Then, two pins connected to the two potentials of the extracted passive component are set as divide neighboring points. If there is a plurality of the corresponding passive components, all detour paths are generated, and a passive component corresponding a shortest path or that closest to the divide portion is selected.

As described above, the path search processing of this embodiment is applicable not only to a detour path which goes through the signal layer but also to a case in which other conductive layers are to be detoured.

In the example of the above description, as the output of the processing result, a file that describes detour path information is stored or a detour path or whole return current path is displayed on the monitor 113. Also, a method of evaluating a detour path as the processing result is available. For example, evaluation based on a detour area, which poses a problem upon detour of a return current, can be made.

Figure 12:
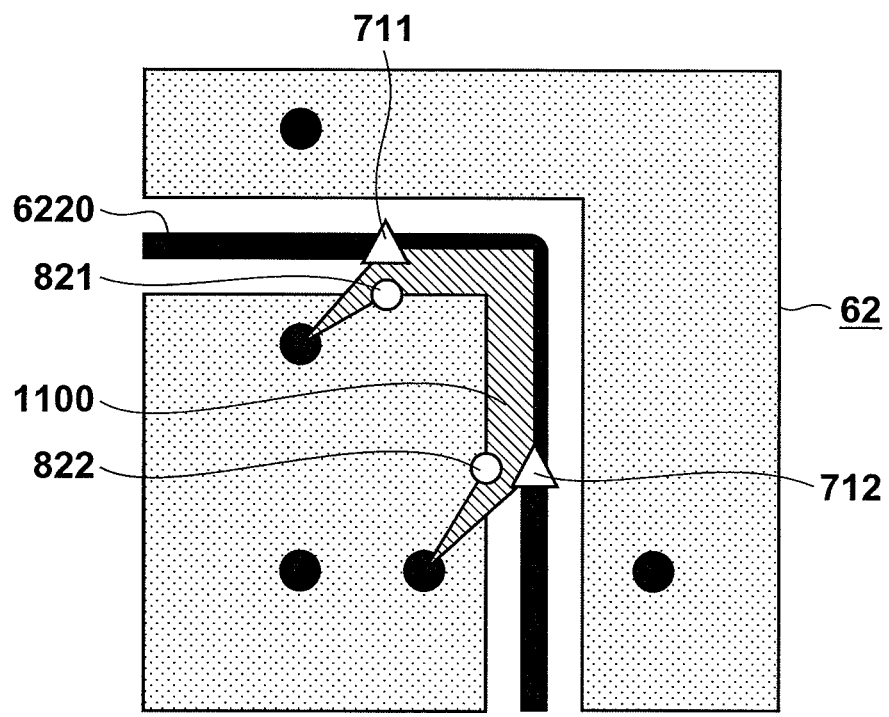
FIG. 12 is a view for explaining evaluation of the detour path.

Evaluation of a detour path will be described below with reference to FIG. 12. The path search unit 22 calculates a detour area 1100 bounded by the signal line 6220 and detour path. Then, the path search unit 22 calculates a detour area of the detour area 1100 in consideration of a gradient in the laminating direction of the printed circuit board. The path search unit 22 then calculates an ideal area free from any division from the distance of the signal line 6220 between the divide points 711 and 712 and the interlayer distance to the adjacent layer. After that, the path search unit 22 notifies a result obtained by calculating a ratio between the detour area and ideal area, and comparing the ratio with a predetermined threshold.

That is, assuming that R=detour area/ideal area>1 and the predetermined threshold Th≥1, if R≤Th, for example, an evaluation result "good: the detour area is equal to or smaller than a limit value" is output. On the other hand, if R>Th, an evaluation result "bad: the detour area exceeds a limit value" is output. Note that the threshold Th can be set by the user using the input unit 20.

Not only the detour path but also the whole return current path can be similarly evaluated. By adding the evaluation result of the detour area in addition to display of the detour path or return current path, the user can evaluate the return current path/detour path under desired conditions, and can efficiently judge whether or not to modify the layout of the printed circuit board.

In this way, by searching for a return current path which runs close to a signal line, and expressly providing it to the user, user's modification judgment and modification of the layout can be efficiently and appropriately carried out.

Second Embodiment

Information processing according to the second embodiment of the present invention will be described below. The same reference numerals in the second embodiment denote the same parts as those in the first embodiment, and a detailed description thereof will not be repeated.

In the example described in the first embodiment, no condition is set for generation of a detour path. The second embodiment will explain an example in which conditions upon generation of a detour path are set.

[Path Search Processing]

Figure 13:
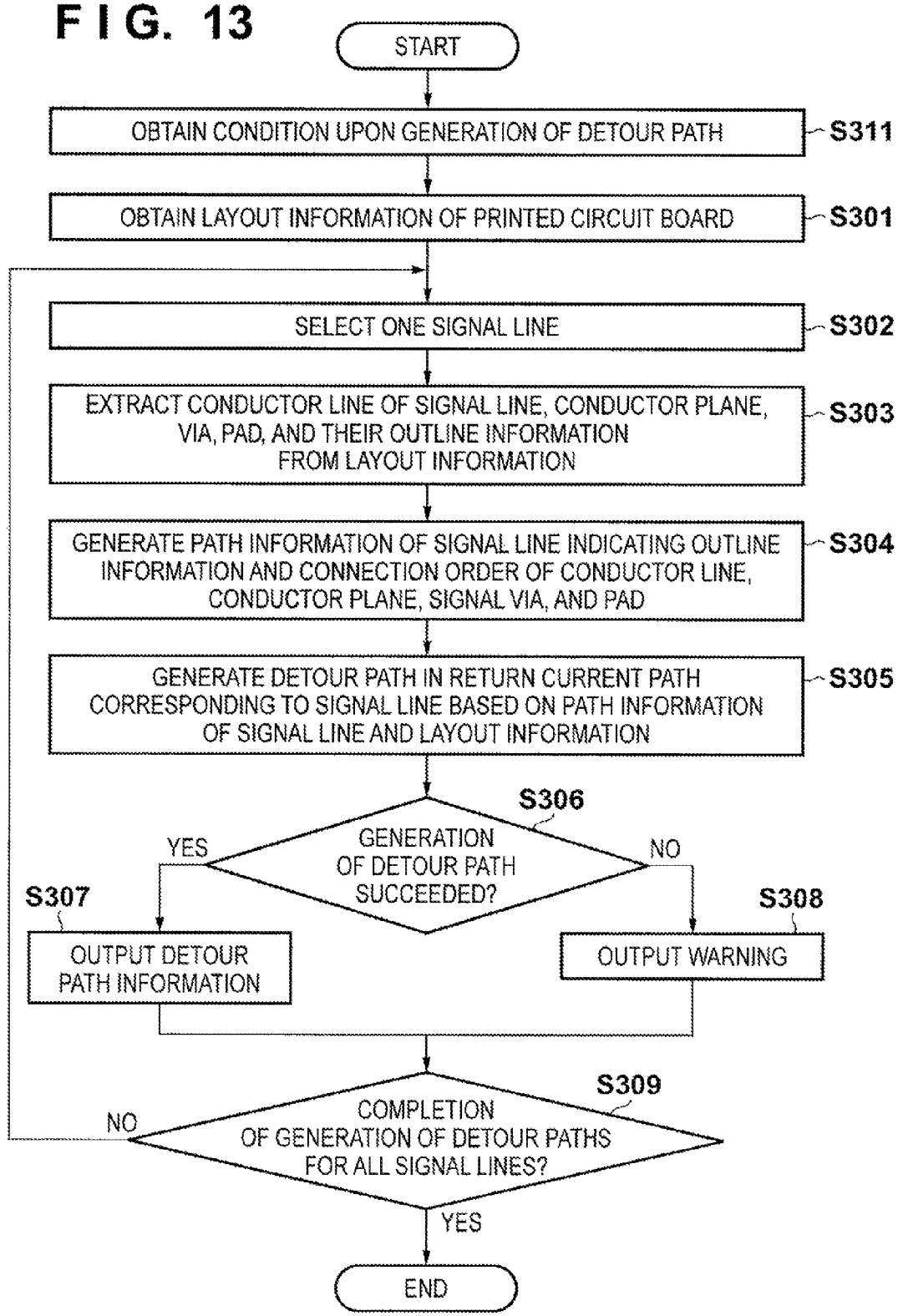
FIG. 13 is a flowchart for explaining path search processing according to the second embodiment.
Figure 15A:
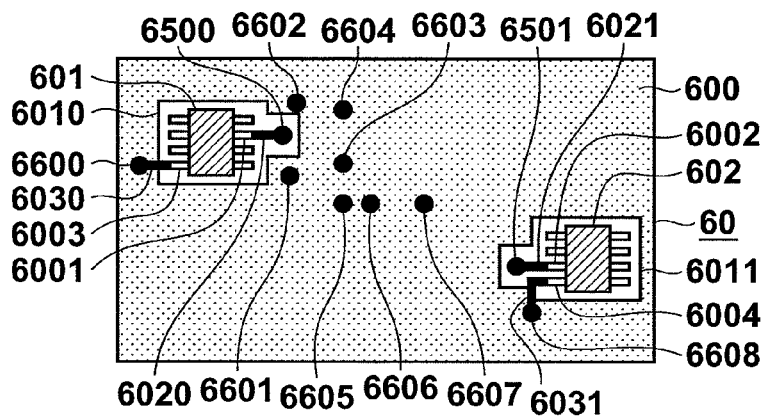
FIGS. 15A to 15D are views showing an example of layout information of a printed circuit board according to the second embodiment.
Figure 15B:
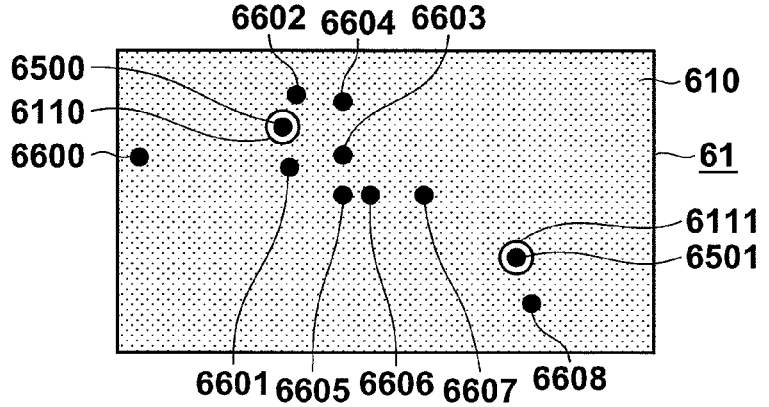
Figure 15C:
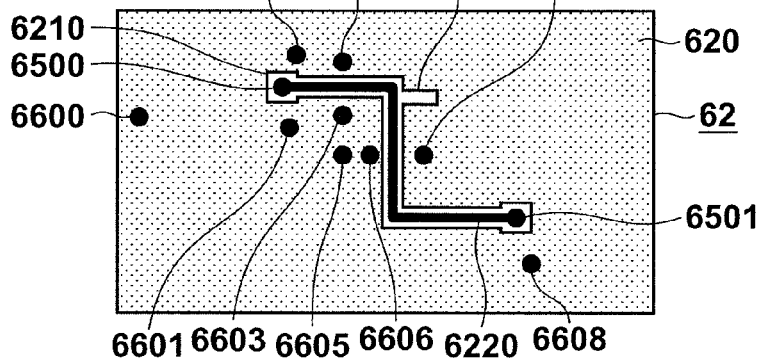
Figure 15D:
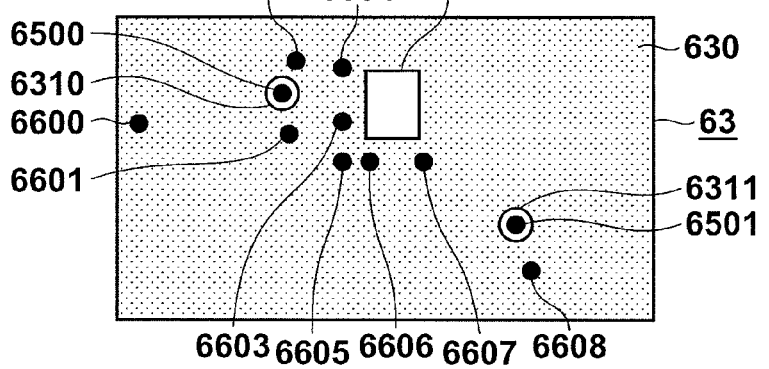

Path search processing of the second embodiment will be described below with reference to the flowchart shown in FIG. 13. Note that in the path search processing shown in FIG. 13, step S311 is added to the path search processing shown in FIG. 5. That is, the path search unit 22 obtains conditions upon generation of a detour path at the time of execution of the path search processing through the input unit 20 or information extraction unit 21 (S311). The conditions upon generation of a detour path include an extraction range of ground vias, a generation allowable range from a signal line at the time of generation of a neighboring path, and the like.

FIG. 14 shows an example of a condition setting screen.

The path search unit 22 displays a dialog shown in FIG. 14 on the monitor 113. Then, the path search unit 22 accepts inputs of conditions, that is, the via extraction range, neighboring path generation allowable range, and the like from the user through the input unit 20. Alternatively, the user may store a text file which records the conditions in a predetermined area of the HDD 108.

The via extraction range is a condition required to shorten a generation time of via paths, and the user inputs a desired value by assuming an upper limit generation time. Also, the user inputs a desired value in the neighboring route generation allowable range, so as to prevent generation of an unintended roundabout detour path. In this case, it is preferable to input a value equal to or smaller than an interlayer distance to the closest layer of conductive layers except for an adjacent layer from which a divide portion is detected and the signal layer, in consideration of the fact that a return current appears as close to a signal as possible. When a detour path generation target layer is set in ascending order of distance to the signal line, the interlayer distance between the signal layer and the next detour path generation target layer may be automatically set for each detour path generation target layer.

[Practical Example of Path Search Processing]

An example of carrying out the path search processing on a printed circuit board having layout information shown in FIGS. 15A to 15D will be described below. Note that the layout information shown in FIGS. 15A to 15D are nearly the same as that shown in FIGS. 4A to 4D, except for a portion 6210a of the shape of the insulation 6210 which surrounds the signal line 6220. The arrangement in the layer direction of the printed circuit board is the same as that shown in FIG. 3 although it is not shown.

The path search unit 22 goes through the processes as in the first embodiment to select the pair of divide points 711 and 712 and to identify divide neighboring points in the ground pattern of the signal layer for the divide point pair (S301 to S409).

Figure 16:
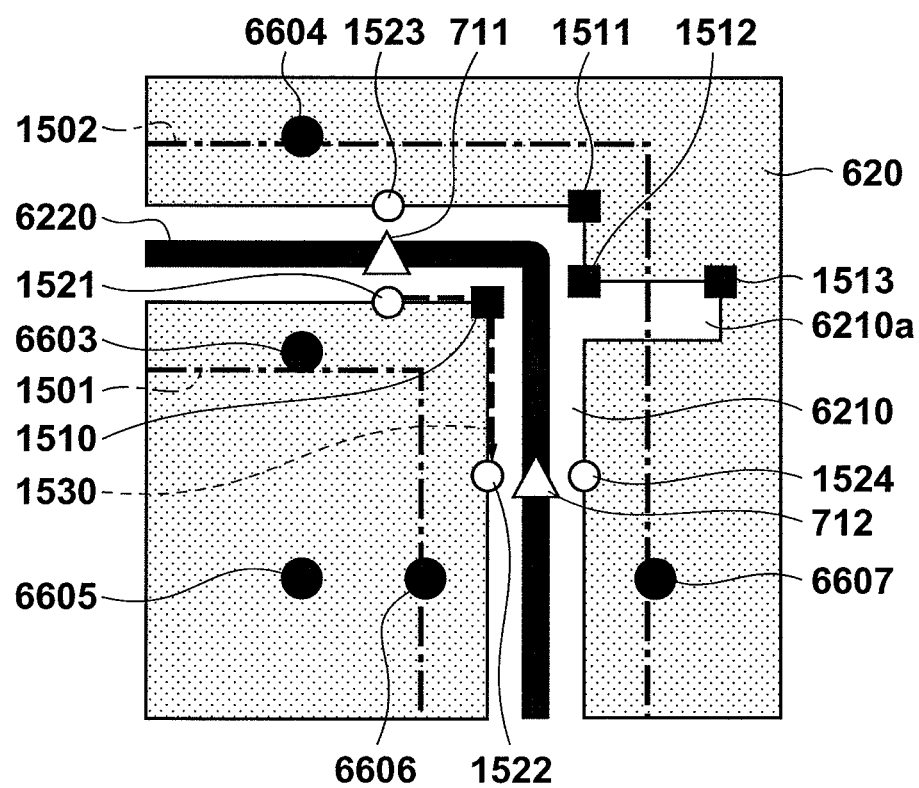
FIG. 16 and FIGS. 17A and 17B are views showing enlarged states around a divide portion on conductive layers.

FIG. 16 shows an enlarged state around a divide portion on the conductive layer 62. In FIG. 16, the divide neighboring point identifying unit 224 identifies divide neighboring points 1521, 1523, 1522, and 1524.

Next, the path search unit 22 controls the neighboring path generation unit 225 to generate neighboring paths between the divide neighboring points 1521 and 1522 and between the divide neighboring points 1523 and 1524 (S410, S411). Generation of a neighboring path between the divide neighboring points 1521 and 1522 will be described below.

Neighboring path generation allowable ranges 1501 and 1502 are indicated by one-dashed chain lines in FIG. 16. That is, a neighboring path can be generated along an edge of the ground pattern 620, which is sandwiched between the signal line 6220 and the generation allowable range 1501 or 1502. The neighboring path generation unit 225 extends a neighboring path from the divide neighboring point 1521 along an edge of the insulation 6210, and detects a bent point 1510. Then, the neighboring path generation unit 225 checks whether or not the bent point 1510 is included in the neighboring path generation allowable range. Since the bent point 1510 is included in the neighboring path generation allowable range, the neighboring path generation unit 225 extends the neighboring path from the bent point 1510 along the edge of the insulation 6210 and reaches the divide neighboring point 1522. That is, the neighboring path is generated between the pair of divide neighboring points 1521 and 1522.

Next, the neighboring path generation unit 225 extends a neighboring path from the divide neighboring point 1523 along the edge of the insulation 6210, and detects a bent point 1511. Since the bent point 1511 is included in the neighboring path generation allowable range, the neighboring path generation unit 225 extends the neighboring path from the bent point 1511 along the edge of the insulation 6210, and detects a bent point 1512. Since the bent point 1512 is included in the neighboring path generation allowable range, the neighboring path generation unit 225 extends the neighboring path from the bent point 1512 along the edge of the insulation 6210, and detects a bent point 1513. The bent point 1513 is not included in the neighboring path generation allowable range. Therefore, at the detection timing of the bent point 1513, generation of the neighboring path between the pair of divide neighboring points 1523 and 1524 is interrupted, and a result indicating that the neighboring path between the pair of divide neighboring points 1523 and 1524 is not generated is recorded.

Note that after generation of the neighboring paths, whether or not each neighboring path falls within the neighboring path generation allowable range may be checked, and a neighboring path outside the generation allowable range may be deleted.

Next, the path search unit 22 controls the via extraction unit 226 to extract ground vias which electrically connect at least the ground patterns of the signal layer and the adjacent layer within via extraction ranges respectively having the divide neighboring points 1521 and 1522 as the centers (S412, S413).

Figure 17A:
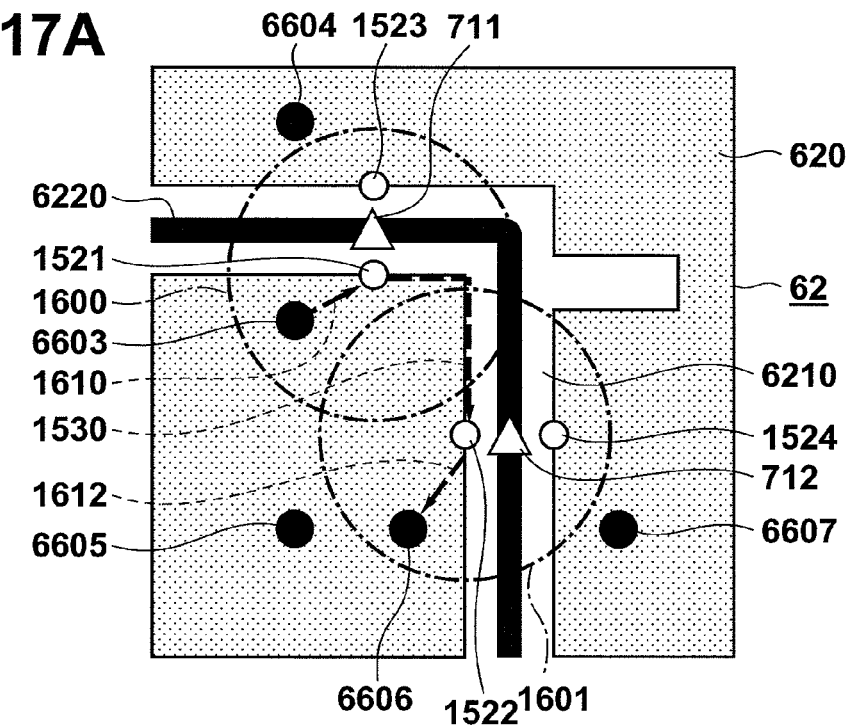
Figure 17B:
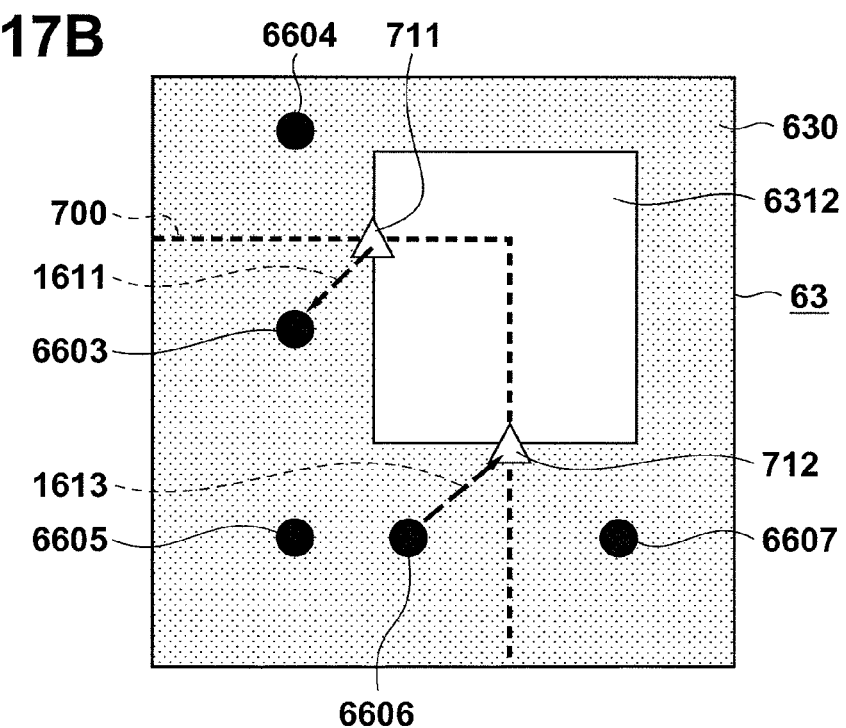

FIGS. 17A and 17B show enlarged states around a divide portion on the conductive layers 62 and 63. One-dashed chain line circles 1600 and 1601 shown in FIG. 17A represent via extraction ranges respectively having the divide neighboring points 1521 and 1522 as the centers. Therefore, the via extraction unit 226 extracts, as ground vias, only the ground via 6603 for the divide neighboring point 1521 and only the ground via 6606 for the divide neighboring point 1522.

Next, the path search unit 22 controls the via path generation unit 227 to generate via paths (S414 to S420). The via path generation unit 227 joins paths 1610 and 1611 to generate a via path A2 between the divide point 711 and divide neighboring point 1521. Also, the via path generation unit 227 joins paths 1612 and 1613 to generate a via path B2 between the divide point 712 and divide neighboring point 1522.

In this manner, by setting the via extraction ranges, the number of ground vias to be extracted is reduced to reduce the number of generation times of via paths, thereby shortening a via path generation time.

Next, the path search unit 22 controls the detour path generation unit 228 to generate a detour path by joining the neighboring path 1530 and the via paths A2 and B2 (S421). Then, the path search unit 22 outputs detour path information (S307).

Figure 18:
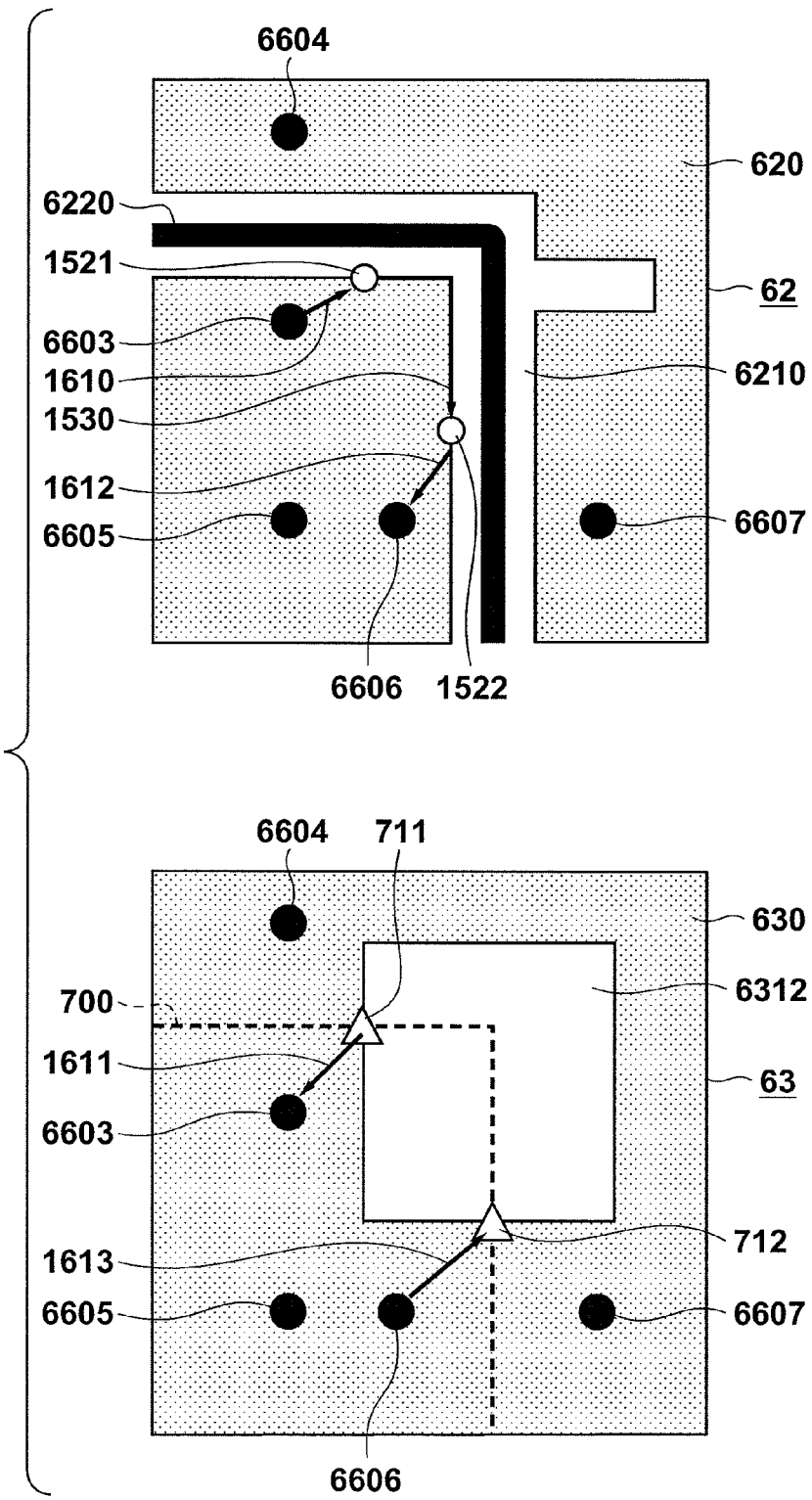
FIG. 18 is a view showing a display example of a detour path.

FIG. 18 shows a display example of the detour path. As shown in FIG. 18, on enlarged views around a divide portion, a detour path obtained by joining the paths 1611, 1610, 1530, 1612, and 1613 is displayed.

FIG. 19 shows another display example of the detour path. As shown in FIG. 19, the projected path (broken line) of the signal line, and a whole return current path which joins from a ground pin of the component to the end point of the projected path of the signal line may be displayed.

In the above example, the neighboring path generation unit 225 can generate the neighboring path corresponding to one side of the signal line 6220, but cannot generate the neighboring path corresponding to the other side. Hence, the path search unit 22 generates warning information (S423).

FIG. 20 shows an example of detour path information. The detour path information of a table format has a field which records a cause of a generation failure of a detour path in addition to fields indicating a signal line name, layer, divide portion (coordinate thereof), and length of a detour path (detour length). The second row of the detour path information shown in FIG. 20 indicates that the generation of the detour path has succeeded, and the first row indicates that the generation of the detour path has failed due to a generation failure of the neighboring path. Note that such detour path information may be output to the monitor 113.

As described above, by setting the conditions upon generation of the detour path, the processing time of the path search processing can be shortened, and generation of an unintended roundabout detour path can be avoided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-013373, filed Jan. 25, 2011, which is hereby incorporated by reference herein in its entirety.

What is claimed is:

1. A design support apparatus for supporting design of a printed circuit board, comprising:
   an obtaining section configured to obtain, from a memory, layout information indicating at least locations of components and conductive layers on the printed circuit board, and layouts of conductor patterns on the respective conductive layers and vias which electrically connect between the conductive layers;
   a first generator configured to generate path information indicating a path of one signal line with reference to the layout information;
   a detector configured to detect a divide portion where a path of a return current corresponding to a signal current of the signal line is divided with reference to the layout information and the path information; and
   a second generator configured to generate information indicating a detour path of the return current in a neighborhood of the divide portion based on first and second divide points and first and second divide neighboring points at the divide portion,
   wherein the first and second divide points are located on an adjacent layer as a conductive layer adjacent to a signal layer as a conductive layer on which the signal line is wired,
   wherein the first divide neighboring point is located on the signal layer and located in a neighborhood of the first divide point, and the second divide neighboring point is located on the signal layer and located in a neighborhood of the second divide point, and
   wherein the second generator comprises a first generating section configured to generate a neighboring path which joins between the first and second divide neighboring points along an edge of a constant potential wiring pattern of the signal layer to which a constant potential is applied so as to generate the information indicating the detour path.

2. The apparatus according to claim 1, wherein the detector projects the path of the signal line onto the adjacent layer, and detects, as the divide portion, crossing where the projected path crosses insulation which exists on the adjacent layer.

3. The apparatus according to claim 2, wherein the second generator further comprises:
   a first identifying section configured to identify the first divide point where the projected path goes outside a constant potential wiring pattern of the adjacent layer and the second divide point where the projected path which goes outside the constant potential wiring pattern comes inside the constant potential wiring pattern, at the divide portion;
   a second identifying section configured to identify the first divide neighboring point and the second divide neighboring point on the constant potential wiring pattern of the signal layer;
   an extracting section configured to extract one or more vias which electrically connects at least the constant potential wiring pattern of the signal layer and the constant potential wiring pattern of the adjacent layer;
   a second generating section configured to generate a first via path which joins the first divide point and the first divide neighboring point through some of the extracted vias, and a second via path which joins the second divide point and the second divide neighboring point through some of the extracted vias; and
   a joining section configured to generate the detour path by joining the neighboring path, the first via path, and the second via path.

4. The apparatus according to claim 3, wherein the constant potential wiring pattern comprises a ground pattern, a power-supply wiring pattern, and an electrostatic shield wiring pattern.

5. The apparatus according to claim 3, wherein the second identifying section identifies the first divide neighboring point and the second divide neighboring point on the constant potential wiring pattern of the signal layer on two sides of the signal line, and the first generating section generates neighboring paths along edges of the constant potential wiring pattern of the signal layer on the two sides of the signal line.

6. The apparatus according to claim 3, further comprising a warning section configured to generate a warning indicating a generation failure of the detour path information in a case where an identification failure of the first divide neighboring point or the second divide neighboring point occurs, in a case where a generation failure of the neighboring path occurs, in a case where an extraction failure of the vias occurs, or in a case where a generation failure of the first via path or the second via path occurs.

7. The apparatus according to claim 3, further comprising an inputting section configured to input a condition which limits an extraction range of the via.

8. The apparatus according to claim 3, further comprising an inputting section configured to input a condition which limits a generation allowable range of the neighboring path.

9. The apparatus according to claim 3, further comprising an outputting section configured to output the information indicating the detour path.

10. An information processing method of supporting design of a printed circuit board, comprising:
    using a processor to perform the steps of:
    obtaining, from a memory, layout information indicating at least locations of components and conductive layers on the printed circuit board, and layouts of conductor patterns on the respective conductive layers and vias which electrically connect between the conductive layers;
    generating path information indicating a path of one signal line with reference to the layout information;
    detecting a divide portion where a path of a return current corresponding to a signal current of the signal line is divided with reference to the layout information and the path information; and
    generating information indicating a detour path of the return current in a neighborhood of the divide portion based on first and second divide points and first and second divide neighboring points at the divide portion, wherein the first and second divide points are located on an adjacent layer as a conductive layer adjacent to a signal layer as a conductive layer on which the signal line is wired, wherein the first divide neighboring point is located on the signal layer and located in a neighborhood of the first divide point, and the second divide neighboring point is located on the signal layer and located in a neighborhood of the second divide point, and wherein, in the second generating step, a neighboring path is generated so as to generate the information indicating the detour path, and the neighboring path joins between the first and second divide neighboring points along an edge of a constant potential wiring pattern of the signal layer to which a constant potential is applied.

11. A non-transitory computer readable medium storing a computer-executable program for causing a computer to perform an information processing method of supporting design of a printed circuit board, the method comprising:

obtaining, from a memory, layout information indicating at least locations of components and conductive layers on the printed circuit board, and layouts of conductor patterns on the respective conductive layers and vias which electrically connect between the conductive layers;

generating path information indicating a path of one signal line with reference to the layout information;

detecting a divide portion where a path of a return current corresponding to a signal current of the signal line is divided with reference to the layout information and the path information; and generating information indicating a detour path of the return current in a neighborhood of the divide portion based on first and second divide points and first and second divide neighboring points at the divide portion, wherein the first and second divide points are located on an adjacent layer as a conductive layer adjacent to a signal layer as a conductive layer on which the signal line is wired, wherein the first divide neighboring point is located on the signal layer and located in a neighborhood of the first divide point, and the second divide neighboring point is located on the signal layer and located in a neighborhood of the second divide point, and wherein, in the second generating step, a neighboring path is generated so as to generate the information indicating the detour path, and the neighboring path joins between the first and second divide neighboring points along an edge of a constant potential wiring pattern of the signal layer to which a constant potential is applied.

* * * * *